US010613888B1

(12) United States Patent
Mentz et al.

(10) Patent No.: US 10,613,888 B1
(45) Date of Patent: Apr. 7, 2020

(54) CUSTOM PLACEMENT POLICIES FOR VIRTUAL MACHINES

(71) Applicant: Amazon Technologies, Inc., Seattle, WA (US)

(72) Inventors: Joshua Dawie Mentz, Western Cape (ZA); Diwakar Gupta, Seattle, WA (US); Michael Groenewald, Western Cape (ZA); Alan Hadley Goodman, Issaquah, WA (US); Marnus Freeman, Kuilsrivier (ZA)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 14/970,527

(22) Filed: Dec. 15, 2015

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| 6,327,618 | B1 * | 12/2001 | Ahlstrom | ............ | H04L 41/0213 370/254 |
| 8,102,781 | B2 | 1/2012 | Smith | | |
| 8,122,282 | B2 | 2/2012 | Betzler et al. | | |
| 8,738,781 | B2 | 3/2014 | Heim et al. | | |
| 8,732,698 | B2 | 5/2014 | Ling et al. | | |
| 8,843,633 | B2 | 9/2014 | Eriksson et al. | | |
| 9,069,730 | B2 | 6/2015 | Talwar et al. | | |
| 2009/0282404 | A1 * | 11/2009 | Khandekar | ......... | G06F 9/45558 718/1 |
| 2009/0293022 | A1 | 11/2009 | Fries | | |
| 2011/0282985 | A1 * | 11/2011 | Krantz | ................ | H04L 12/5692 709/223 |
| 2011/0314466 | A1 | 12/2011 | Berg et al. | | |
| 2013/0276057 | A1 | 10/2013 | Smith et al. | | |
| 2013/0311662 | A1 | 11/2013 | Stolyar | | |

(Continued)

FOREIGN PATENT DOCUMENTS

| CN | 102541622 | 7/2012 |
| CN | 104063261 | 9/2014 |

OTHER PUBLICATIONS

U.S. Appl. No. 14/658,769, filed Mar. 16, 205, Christopher Richard Jacques De Kadt et al.

(Continued)

*Primary Examiner* — Hiren P Patel
*Assistant Examiner* — Jonathan R Labud
(74) *Attorney, Agent, or Firm* — Robert C. Kowert; Kowert, Hood, Munyon, Rankin & Goetzel, P.C.

(57) ABSTRACT

A component of a computing service obtains respective indications of placement policies that contain host selection rules for application execution environments such as guest virtual machines. With respect to a request for a particular application execution environment, a group of applicable placement policies is identified. A candidate pool of hosts is selected using the group of placement policies, and members of the pool are ranked to identify a particular host on which the requested application execution environment is instantiated.

20 Claims, 12 Drawing Sheets

(56) References Cited

U.S. PATENT DOCUMENTS

| | | | |
|---|---|---|---|
| 2014/0229621 A1 | 8/2014 | Song et al. | |
| 2014/0245425 A1* | 8/2014 | Potlapally | H04L 63/164 |
| | | | 726/14 |
| 2014/0337832 A1* | 11/2014 | Adogla | G06F 9/45533 |
| | | | 718/1 |
| 2016/0004552 A1* | 1/2016 | Innan | G06F 9/5088 |
| | | | 718/1 |
| 2016/0103698 A1* | 4/2016 | Yang | G06F 11/202 |
| | | | 714/4.11 |

OTHER PUBLICATIONS

Find and Buy Server Software and Services that Run on the AWS Cloud, AWS Marketplace, Accessed Feb. 2, 2015, 1 page.
"The Insider Threat", Miltiadis Kandias, Vasilis Stavrou, Downloaded Feb. 25, 2015, 1 page.
"Amazon Elastic Compute Cloud; CLI Reference", Amazon Web Services, API Version Oct. 1, 2014, pp. 1-830.
"Amazon Elastic Compute Cloud; User Guide for Linux", Amazon Web Services, API Version Oct. 1, 2014, pp. 1-673.
Justin Ellingwood, "And Introduction to Kubernetes", Retrieved from URL: https://www.digitalocean.com/community/tutorials/anintroductiontokubernetes, Dec. 6, 2015, pp. 1-10.
Wikipedia, "Apache Mesos", Retrieved from URL: https://en.wikipedia.org/wiki/Apache_Mesos, Dec. 6, 2015, pp. 1-4.
"Kubernetes Overview", Retrieved from URL: http://kubernetes.io/v1.1/docs/userguide/overview.html, Dec. 6, 2015, pp. 1-3.
"Launch an Amazon EC2 Instance—Amazon Elastic Compute Cloud", Amazon Web Services, Retrieved from URL: http://docs.aws.amazon.com/AWSEC2/latest/UserGuide/ec2launchinstance_linux.html, Dec. 6, 2015, pp. 1-3.

* cited by examiner

Placement policy 200
- Policy schema version 201
- Policy name 203
- Creator/owner ID 205
- Validity period 207
- Applicability criteria 209
- VH candidate pool selection ruleset 211
- Candidate ranking ruleset 213
- Precedence priority 215
- Access permissions 218
- Parent/child policy pointers 220
- ...

*FIG. 2*

CUSTOM PLACEMENT POLICIES FOR VIRTUAL MACHINES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. At the same time, if too many virtual machines are set up on a given physical host to support desired levels of application performance, customer satisfaction levels may drop.

Over time, as new types of hardware servers are deployed at a virtualized computing service, as existing servers or data centers become less suitable for various categories of virtual machines, and as applications with a wider range of service level requirements are run using the service, the number of factors which have to be taken into account to select an appropriate virtualization host for a given client's virtual machine request may increase dramatically. Furthermore, the virtual machine placement preferences or requirements of one client of the virtualized computing service may differ from those of another. In large virtualization networks with hundreds of thousands of clients, numerous types of hosts, and numerous categories of supported virtual machines, virtual machine placement decisions may present a non-trivial challenge.

BRIEF DESCRIPTION OF DRAWINGS

FIG. 2 illustrates example elements of a placement policy for guest virtual machines, according to at least some embodiments.

Figure 1:
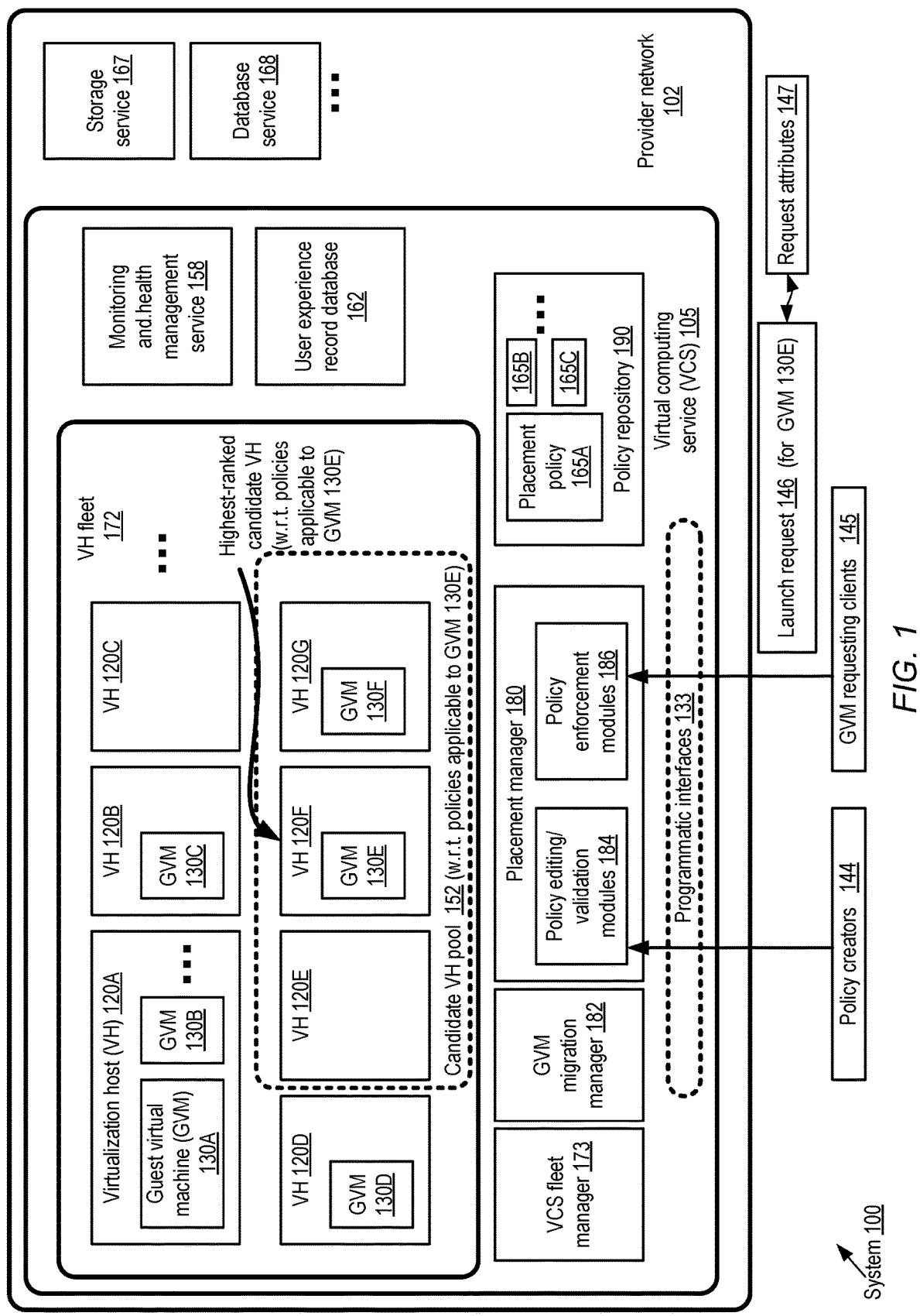
FIG. 1 illustrates an example system environment in which customized placement policies for guest virtual machines may be used at a virtual computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating and applying customizable placement policies for virtual machines are described. The techniques and algorithms may be used to select target virtualization hosts to be used for virtual machines in a variety of contexts or usage modes. In some embodiments, the techniques may be implemented at control-plane components of a virtualized computing service (VCS), and may be used to select virtualization hosts from the VCS's fleet of hosts for new guest virtual machines requested by clients of the VCS. In other embodiments, the placement policies may be applied for virtualization hosts outside the provider network—e.g., a network-accessible placement service may be made available to clients of the VCS, and virtual machines may be placed at hosts located in the client's own network or at third-party networks using the placement service. In one embodiment, a downloadable or installable software component for generating and enforcing placement policies may be generated, and the software component may be used at various computing facilities including private networks located at client premises, networks shared by multiple entities including provider networks, and so on. In addition to being used for determining where new virtual machines should be launched, in at least some embodiments placement policies may also be used to migrate existing virtual machines from one host to another.

In various embodiments, a given placement policy may comprise a number of components or elements, including for example a set of applicability criteria, a set of rules for identifying a pool of candidate virtualization hosts, and/or a set of rules for ranking the candidate virtualization hosts to help identify the particular virtualization host to be used for a particular virtual machine. Several different placement policies may apply to a given request for instantiating a virtual machine in some embodiments, and a combination of the rules indicated in the different applicable policies may be applied systematically (e.g., in order of specified precedence priorities) as described below in further detail. Some policies may be created on behalf of (or by) specific clients or customers, while others may be generated for broad use on behalf of numerous clients. A number of programmatic interfaces (e.g., web-based consoles, application programming interfaces or APIs, command-line tools, graphical user interfaces or the like) may be implemented to enable the creation, viewing, comparison or modification of placement policies in various embodiments.

As mentioned above, in some embodiments placement policies may be enforced by control-plane components of a virtualized computing service (VCS) of a provider network. Generally speaking, networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

The term "control-plane" may be used to refer to administrative or management components of a given provider network service such as the VCS, as opposed to "data-plane" components which may be used primarily to transmit, store or manipulate client application data. The VCS control-plane components responsible for enforcing placement policies, enabling the creation of placement policies and access to placement policies, may collectively be referred to herein as the placement manager of the VCS. A placement manager may comprise numerous software and hardware components in some embodiments; that is, the placement manager may itself be implemented in a distributed manner. In other embodiments, a placement manager may be implemented in a centralized manner, e.g., utilizing a single hardware server. The virtual machines launched at VCS virtualization hosts on behalf of clients may be referred to as "guest virtual machines" or "compute instances". In addition to zero or more guest virtual machines, a given virtualization host may also comprise a virtualization management software stack in various embodiments. The virtualization management software stack may include, for example, a hypervisor and/or an operating system instance running on a special privileged-domain virtual machine. The virtualization management software stack may act as an intermediary between guest virtual machines and hardware devices in various embodiments.

According to one embodiment, a placement manager of a VCS may receive an indication of a placement policy via a programmatic interface such as a web-based console, an API (application programming interface), a command-line tool, or a graphical user interface (GUI). The policy may include one or more applicability criteria, and one or more virtualization host selection rules. The placement manager may run tests to verify that the placement policy meets acceptance criteria of the VCS—for example, to verify that the submitter of the policy has the required permissions, to validate the syntax and format of the various elements of the policy, to ensure that the policy does not violate any previously-defined policies of a higher priority, to ensure that the policy is implementable given overall constraints on VCS resources, and so on. If the placement policy meets the acceptance criteria, it may be added to a policy repository of the VCS. If the placement policy fails to meet the acceptance criteria, a rejection notification may be provided to the submitter of the policy in some embodiments. The rejection notification may indicate the causes of the rejection in some implementations. Over time, numerous placement policies with respective sets of applicability criteria and host selection rules may be accumulated in the policy repository. In various embodiments, at least some of the policies may have respective validity periods, e.g., either indicated by the policy submitter or determined by the placement manager. Validity periods may be modified using the programmatic interfaces of the VCS in some embodiments—e.g., a client may extend or shorten the validity period of a given policy. In such embodiments, expired policies may be pruned from the repository, e.g., by a periodic cleanup thread. In some embodiments, an optimized representation of at least some subset of the repository's policies may be stored in local policy caches at various components of the placement manager, e.g., to avoid having to access the repository when responding to a request to launch a guest virtual machine.

In response to a request to launch or instantiate a guest virtual machine, a VCS control-plane component such as the placement manager may identify, based at least in part on one or more attributes or parameters of the launch request, a placement policy or a collection of placement policies applicable to the launch request. For example, the launch request may explicitly or implicitly indicate the category of guest virtual machine which is to be launched, the identity of the client on whose behalf the guest virtual machine is to be launched, some guidance about a preferred location for the guest virtual machine, and so on, and these attributes may be used to identify the group of applicable placement policies. Using the group of policies, a candidate pool of virtualization hosts, typically comprising a subset of the VCS host fleet, may be identified for the launch request. Some types of hosts may be excluded from the candidate pool based on specific hardware or software component requirements indicated in the policies, for example. After a candidate pool has been identified, the candidates may be ranked relative to one another using the policies—e.g., based on factors such as the network distance (or physical distance) of the candidates from other guest virtual machines of the same client or from devices of other provider network services that the client is expected to use, measures or estimates of the workload levels of the candidates, and so on. A target virtualization host for the requested guest virtual machine may be identified based on the ranking, and the commands for instantiating the guest virtual machine may be executed at the target virtualization host. Similarly, when subsequent requests to launch guest virtual machines are received, the applicable set of policies for each such request may be identified, candidate pools of virtualization hosts may be populated and ranked, and target virtualization hosts may be selected for each request. In some embodiments, respective sets of placement policies may be identified and applied at several stages—e.g., an initial set of placement policies may be identified based on attributes of a launch request, the process of identifying a candidate pool of virtualization hosts may be begun using the initial of policies, and additional placement policies (e.g., data-center-specific policies or other location-specific policies) may be identified and applied as different hosts are considered or ranked as candidates.

In some embodiments, new placement policies may be generated automatically (e.g., by various VCS control-plane components) based on triggering conditions or events. For example, in one embodiment, health and/or performance metrics may be collected periodically from virtualization hosts. If the collected metrics indicate, for example, that resource utilization levels at a particular portion of the VCS network exceed targeted thresholds persistently, a new policy which reduces the chances of selecting virtualization hosts from that portion of the VCS network may be generated automatically. In another embodiment, a database of support requests or client complaints (or other customer feedback) may be maintained for the VCS and/or other services of the provider network. If the analysis of the database indicates that a particular client has encountered numerous problems at a particular type of virtualization host, a placement policy that avoids using that particular type of virtualization host for that client (or for other clients with similar requirements) may be generated automatically.

In at least one embodiment, a client of the VCS may register a set of external virtualization hosts (e.g., hosts located on client-owned premises or third-party premises rather than within the provider network's data centers) as part of the fleet of hosts for which placement decisions are to be made by the VCS placement manager. In such an embodiment, requests for instantiating virtual machines using the external set of virtualization hosts may be transmitted to the VCS placement manager. The VCS placement manager may identify and enforce the applicable policies to identify the respective target virtualization host from the external set for a given virtual machine request, using logic similar to that described above for requests to instantiate virtual machines using the VCS's own fleet of hosts. In some embodiments, clients may set up their own placement managers, e.g., at client premises or third party premises, using installable software packages provided by the provider network operator. In one embodiment, a given placement policy may result in the selection of a provider network virtualization host or an external host for a given virtual machine—that is, policies that cover collections of hosts located in multiple networks may be defined and used.

In some embodiments in which multiple placement policies may be applicable to a particular guest virtual machine request, respective precedence priorities may be associated with the policies. The precedence priorities may indicate which of a given pair of policies overrides the other. In some embodiments, a set of system-defined policies may be designated as having the highest precedence priority (so that, for example, a client-defined policy may not override a system-defined policy). Within a single policy, multiple rules may be indicated for identifying candidate hosts or ranking candidate hosts in some embodiments. Respective rule-level precedence priorities may be set for individual rules in such embodiments. In some embodiments, rules of a given policy may be defined using Boolean operators to combine individual rule clauses—e.g., AND, OR, or NOT operators may be used to combine rules. Precedence priorities at the policy level and/or the rule level may be indicated or modified using programmatic interfaces by the policy submitters or other authorized entities in various embodiments, and may have to be approved by the placement manager. In at least one embodiment, an aggregation function indicated in a policy may be used to combine several different virtualization host ranking metrics—e.g., the arithmetic mean or geometric mean of several different metrics may be used to determine a composite ranking metric.

Numerous categories of guest virtual machines may be supported at a virtualized computing service in different embodiments, with the categories differing from one another in their hardware and/or software components, performance capacity, the kinds of applications for which the guest virtual machines are best suited, the pricing models associated with the guest virtual machines, and/or other properties. In various embodiments, at least some placement policies may be applicable for only a subset of guest virtual machine categories. In some embodiments, the applicability criteria for a given policy may indicate groups of guest virtual machines (in addition to or instead of VCS-defined guest virtual machine categories) to which the policy applies. For example, some policies may apply to all the guest virtual machines associated with a given client account, or to an application group or placement group of a given of the client. A set of guest virtual machines which are collectively being used for a particular application or a set of related applications on behalf of a client may be defined as an application group by the client. Some client applications may run better on operating systems which only run on a particular subset of virtualization hosts, for example, and placement policies that tend to favor the selection of that subset of hosts may be created and enforced in such scenarios. A placement group may comprise a client-defined group of guest virtual machines, such that the physical or network locations of the hosts at which the members of the placement group are instantiated meet a condition specified by the client, and some placement policies may apply only to particular placement groups. In one embodiments, clients may be able to associate tags (e.g., strings chosen by the clients, such as "marketing-department" or "sales") with one or more guest virtual machines, application groups or placement groups, and the applicability criteria for a given placement policy may indicate guest virtual machines to which the placement policy is to be applied using such tags.

A number of different kinds of location-based applicability criteria for placement policies may be defined in some embodiments. In one embodiment, a provider network at which a VCS is implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers. Some location-dependent placement policies may apply to specified regions, availability containers, data centers, rooms within data centers, or even to particular server racks (or types of racks) in various embodiments. In one embodiment, when a decision is made to shut down hosts located a particular physical location at some future time (e.g., for extended maintenance, repair, or if the location is to be taken offline permanently), policies that tend to avoid the selection of hosts at that physical location for guest virtual machines that are expected to remain in existence for long periods may be created and enforced.

In some embodiments, the rules used for selecting or excluding virtualization hosts from a candidate pool may take any of several factors into account. For example, some categories of guest virtual machines may require specific hardware components or software stacks (including, for example, virtualization management software components such as hypervisors, operating systems and the like) which are only available at a subset of the virtualization hosts of the VCS, so hosts that do not have the required hardware or software may be eliminated from consideration as candidates. Some virtualization hosts may be excluded from a candidate pool based on their network locations and/or physical locations, such as the particular data centers at which the hosts are located. A host which is currently running a particular type of guest virtual machine may be eliminated from consideration as a candidate for a new guest virtual machine in some embodiments—e.g., based on single-tenancy requirements associated with the new guest virtual machine.

Several kinds of ranking rules for candidate virtualization hosts may be specified in placement policies in various embodiments. For example, some ranking rules may be created to increase the physical spread of a given client's set of guest virtual machines—e.g., if choosing candidate host H1 results in a wider physical distribution of the client's fleet of guest virtual machines than choosing candidate H2, H1 would be ranked higher than H2. A particular client may be very concerned about possible data loss if any two of their guest virtual machines are launched on the same host, for example, so a placement policy that strongly ranks hosts based on physical separation or spread of the client's guest virtual machines may be used for that client. Various formulas for computing metrics representing the spread or physical distribution of a given group of compute instances may be employed in different embodiments—e.g., if a pair of a given client's guest virtual machines are instantiated in respective hosts in separate data centers, a spread metric of S1 may be generated, while if the hosts are in separate rooms within the same data center, a smaller spread metric S2 may be generated.

Candidate virtualization hosts may also be ranked based on their total (or currently unused) performance capacities, proximity with respect to resources of other provide network services (e.g., a storage service which supports block-device level interfaces, which may be used from the guest virtual machine to be launched for the client), or some measure of infrastructure-related costs (e.g., because costs associated with cooling or heating respective groups of virtualization hosts may differ, depending on where the hosts are located). In one embodiment licensing efficiency may be taken into account when ranking candidate virtualization hosts. For example, some software vendors may license their software at a host level for a minimum time period (e.g., 30 days), so if a particular virtualization host H1 has an unexpired license for a software package Pkg1, that host may be ranked higher for certain types of guest virtual machine requests than a different host H2 which does not have such a license. In some embodiments in which multiple ranking rules are used, a respective numeric ranking metric may be generated using each rule. Each of the ranking rules may be assigned a respective weight or strength in such embodiments, and a composite or aggregate ranking metric may be generated (e.g., using a geometric mean or arithmetic mean of weighted individual ranking metrics corresponding to the different ranking criteria). The aggregate ranking metric may then be used to select a particular virtualization host from among the candidates.

In various embodiments easy-to-use programmatic interfaces may be implemented by the placement manager or other components of a VCS to enable clients, VCS administrators and/or other authorized users to create, search, view, modify, delete, compare or perform other operations on placement policies. Such interfaces may for example enable authorized users to specify policy applicability criteria, candidate pool selection rules, ranking rules and the like. Logical operations such as Boolean ANDS, ORs, NOTs and the like may be used to combine various criteria or rule predicates in some embodiments using the programmatic interface. The interfaces may be used to assign weights (e.g., to ranking criteria) and/or to specify the specific aggregation functions (e.g., arithmetic, geometric or harmonic means) to be used to combine multiple ranking metrics into an aggregate ranking metric. Precedence criteria for different placement policies may be specified by clients programmatically in some embodiments. The set of supported interfaces may include web-based consoles, APIs, command-line tools, graphical user interfaces, and the like in various embodiments.

In response to receiving an indication of a new placement policy or a modified placement policy via such an interface, in various embodiments the placement manager may perform one or more validation operations to ensure that the new or modified policy meets VCS acceptance criteria (e.g., criteria for syntax correctness, or criteria for compatibility with VCS-defined policies which have higher precedence) before saving the policy in a repository. In at least one embodiment, a client may submit a newly-created placement policy with a guest virtual machine launch request, or refer to an existing policy in one of the parameters of a launch request. At least some of the placement policies may have associated validity periods—e.g., a given placement policy may expire after some number of days have elapsed since it was activated, unless its validity period is extended using one of the programmatic policy-modification interfaces of the VCS. In addition to being used for launching new guest virtual machines, in one embodiment placement policies may also be used when migrating existing guest virtual machines from one host to another (e.g., during live migrations in which the migrating guest virtual machine is not rebooted during the migration procedure, or during reboot migrations in which the migrating guest virtual machine is taken offline briefly during the migration procedure).

In at least one embodiment, customizable placement policies similar to those discussed above may be used for instantiating or migrating other types of application execution environments in addition to, or instead of, for instantiating or migrating guest virtual machines. As used herein, the term "application execution environment" refers to a software platform, typically but not necessarily configured on a single host, which can be assigned or allocated to a client or an administrator of a network-accessible computing service to enable a desired set of applications to be run. Examples of such application execution environments may include un-virtualized instances of operating systems, guest virtual machines, administrative-domain virtual machines, and the like in various embodiments. In one embodiment, some of the clients of a computing service of a provider network may request allocation of un-virtualized operating system instances on so-called "bare-metal" hosts (e.g., hosts which do not necessarily have full virtualization management software stacks installed), and the service may select appropriate hosts for such operating system instances using placement policies of the type discussed above. In some embodiments, much or all of logic that is often implemented at a hypervisor or other components of typical virtualization management software stacks may be implemented in hardware devices (such as peripheral devices attached to an I/O bus) of the host instead, and the placement of application execution environments on such enhanced hosts may also be managed using placement policies. Placement policies may also be used for selecting hosts for application execution environments at which administrative components of various services at a provider network are to be run in some embodiments. For example, hosts may be selected using the policies for customized or streamlined operating systems at which provider network routing applications, load balancing applications, database management applications etc. are to be executed.

Example System Environment

FIG. 1 illustrates an example system environment in which customized placement policies for guest virtual machines may be used at a virtual computing service, according to at least some embodiments. As shown, system 100 includes a provider network 102 at which a number of network-accessible services including a virtualized computing service (VCS) 105, a storage service 167 and a database service 168 are implemented. Virtualization host (VH) fleet 172 of VCS 105 may include numerous virtualization hosts 120 (such as VHs 120A-120G) which may differ from one another in various characteristics such as their hardware architecture, performance capabilities, virtualization management stack components, supported operating systems, and the like. A given virtualization host may be used to execute one or more guest virtual machines (GVMs) 130 instantiated in response to launch requests (such as launch request 146) received from clients of the VCS 105. For example, GVMS 130A and 130B run at VH 120A, GVM 130C runs at VH 120B, GVM 130D runs at VH 120D, GVM 130F runs at VH 120G, and so on.

The particular virtualization host at which a requested GVM is to be launched may be selected in the depicted embodiment by a placement manager 180 using one or more customizable placement policies 165 (e.g., policies 165A-165C saved in a VCS policy store or repository 190). Placement manager 180 and policy repository 190 may form a subset of the control-plane or administrative resources of the VCS 105 in various embodiments (as opposed to the data-plane resources of the VCS, which may include the GVMs 130 and may be used primarily to process, transmit, or store client application data).

The placement manager 180 may implement one or more sets of programmatic interfaces 133 in the depicted embodiment for interactions with GVM requesting clients 145 and authorized placement policy creators 144. The programmatic interfaces may include, for example, one or more web-based consoles, APIs, command-line tools, graphical user interfaces and the like. In some implementations, separate sets of programmatic interfaces may be provided for policy creators 144 and GVM requesters 145.

An authorized policy creator 144 (e.g., an administrator of the VCS or one of the other services of the provider network 102, or a privileged client of the VCS) may submit a new placement policy using the programmatic interfaces, or edit an existing policy 165. Policy editing and validation modules 184 of the placement manager may execute one or more tests to ensure that the proposed new or modified policy meets acceptance criteria of the VCS in the depicted embodiment. If the policy is deemed acceptable, it may be added to the policy store 190; otherwise, the policy creator may be informed that the policy is unacceptable. To determine whether a given policy is acceptable, in some embodiments the editing/validation modules 184 may first check that the policy is formatted according to a supported syntax. For example, in one embodiment the VCS may enable potential policy creators to obtain a policy schema specification document (e.g., via the VCS programmatic interfaces) which defines the particular languages or formats (e.g., a version of the Extensible Markup Language or XML, or a version of the Javascript Structured Object Notation or JSON format) in which placement policies can be expressed, required and optional subcomponents of policies, the defaults corresponding to the optional subcomponents of policies, VCS rules or meta-policies which cannot be violated, and so on. If the policy passes the syntax check, the compatibility of the policy with respect to previously-defined policies (which may include one or more inviolable policies established by the VCS) may be checked in some embodiments, and the policy may be rejected if it contradicts or violates a higher-level or higher-priority policy. The policy may also be checked for implementation feasibility—e.g., if the policy requires that each of a given client's GVMs be launched at a separate data center, the VCS may not be able to enforce the policy for more than a few GVMs and so may reject the policy.

A given policy 165 may include, among other elements such as those discussed below in the context of FIG. 2, applicability criteria indicating the kinds of GVMs or VHs to which it applies, a VH candidate pool selection rule set, and a VH candidate ranking rule set. Upon receiving a particular launch request 146 (e.g., for a GVM 130E) with request attributes 147 from a client 145, policy enforcement modules 186 of the placement manager may identify a set of one or more policies 165 which are applicable to the launch request 146 in the depicted embodiment. The attributes 147 of the request may, for example, implicitly or explicitly indicate the identity of the client on whose behalf the GVM 130 is to be instantiated, the category of the requested GVM (e.g., selected by the requester from a catalog of GVM categories supported at the VCS 105), the availability container or data center at which the GVM is to be launched, and so on. The policy enforcement modules 186 may identify the relevant placement policies 165 based at least in part on one or more request attributes 147 and the applicability criteria defined for the policies in the depicted embodiment. A number of different kinds of applicability criteria may be used in various embodiments, such as applicability based on client identity, VH location, GVM category, application group membership or placement group membership, etc., as described below in further detail. In some embodiments as also discussed below, a cached version of a set of placement policies 165 may be maintained at the placement manager, so that placement decisions may be made more efficiently than if queries had to be directed to policy store 190 for each launch request. It is noted that the placement manager 180 may itself be implemented in a distributed manner in at least some embodiment, with respective policy enforcement modules executing at different hardware servers.

A candidate pool 152 of virtualization hosts may be identified for the request 146 in the depicted embodiment, based at least in part on the candidate pool selection rule sets of the applicable policies. In some embodiments, in scenarios in which multiple placement policies apply to a given request 146, the rules in the policies may be enforced in accordance with respective precedence priorities associated with the policies. For request 146 pertaining to GVM 130E, candidate VH pool 152 comprises VHs 120E, 120F and 120G. It is noted that although a small candidate pool has been shown in FIG. 1 due to space limitations, in practice a candidate pool may comprise hundreds or thousands of virtualization hosts in at least some embodiments. After the members of candidate pool 152 have been identified, they may be ranked relative to one another using the ranking rule sets of the applicable placement policies in the depicted embodiment. Ranking rules may be designed based on various factors as discussed in detail below, such as the spread or physical distribution of the requesting client's set of GVMs, proximity of the requested GVM to resources of a different service (which is likely to be used from the requested GVM) such as storage service 166 or database service 167, licensing efficiency, and so on. In one implementation respective numeric ranking metrics may be calculated for each applicable ranking rule of a given policy, and the individual metrics may be combined into an aggregate ranking metric using a combination technique indicated in the policy. If multiple policies apply, the ranking rules of the policies may be applied in order of precedence priorities in some embodiments. In one embodiment, respective weights may be assigned to the different ranking rules of a given policy (or to ranking rules of different applicable policies) and the weights may be used to arrive at an aggregate ranking metric for a given virtualization host. The results of the ranking may be used to identify the target virtualization host for the requested GVM. In the depicted example, VH 120F is selected as the target for GVM 130E based on its ranking among the members of pool 152. The GVM 130E may be launched at the target virtualization host, and the client 145 may be notified via the programmatic interfaces 133 that the GVM is available for use.

The VCS control-plane may also include a fleet manager 173 and a GVM migration manager 182 in the depicted embodiment. The fleet manager 173 may be responsible for implementing high-level VCS strategies that typically affect large numbers of the VHs (or the entire VH fleet 172) over relatively long time periods—e.g., decisions to gradually deprecate one type of hardware host in favor of another may be made by the fleet manager 173, or decisions to set the overall goal for host utilization levels may be made by the fleet manager 173. In at least some embodiments, at least a subset of the placement policies 165 may be generated to implement decisions made at the fleet manager level. The GVM migration manager 182 may be responsible for deciding, based on various factors, whether to move existing GVMs from their current virtualization hosts to different virtualization hosts. The GVM migration manager 182 may, for example, determine that a set of GVMs is to be transferred or migrated (e.g., because their current hosts are too overloaded, being deprecated, or need to be taken offline for maintenance reasons), and use one or more of the placement policies 165 to select the target virtualization hosts for the migrations. A number of different types of placement policy-based migrations may be supported in various embodiments, including for example live migrations (in which the migrating GVM does not need to be rebooted during the migration procedure) or reboot migrations (in which the migrating GVM is stopped and restarted during the migration procedure).

In at least some embodiments, one or more of the placement policies 165 may be generated automatically by VCS control-plane components based on changing conditions in the VCS fleet. For example, respective sets of health metrics associated with the various virtualization hosts of the virtualized computing service may be collected by a health monitoring service 158 and/or by the fleet manager 173 of the VCS control-plane. Based at least in part on the collected health metrics for some subset of the host fleet, and on various service quality objectives of the VCS, new placement policies 165 may be created or removed over time, e.g., by the health monitoring service, the placement manager or the fleet manager. In one scenario, if the health metrics indicate that the utilization levels of some collection of VHs consistently exceed a threshold, a policy that tends to avoid those hosts may be created and applied, e.g., at least for some duration until the utilization levels fall below the thresholds. In another embodiment, a database of user experience records 162 (which may be managed by a customer support organization of the VCS) may be used to generate new placement policies automatically. For example, if a given client C1 repeatedly encounters problems with their applications when the applications are run on a particular stack of VH hardware or software, policies to avoid that stack of VH hardware or software for C1's future launch requests may be created automatically by the placement manager or some other control-plane component. In at least some embodiment, some of the placement policies 165 may be generated, applied and/or deleted without notifying the clients whose GVMs are affected by the policies. Some clients may not necessarily be aware of the use of placement policies in various embodiments.

In one embodiment, a client may submit a launch request 146 which includes or indicates a new placement policy which has not previously been transmitted to or accepted by the placement manager. In such a scenario, the new placement policy may be analyzed by the placement manager for acceptability (e.g., by checking the syntax of the policy and/or the compatibility of the policy with previously-defined higher-priority policies as discussed above). If the new policy is acceptable, it may be used (in combination with any other placement policies which may be applicable) to select the target virtualization host for the launch request. Depending on the preferences of the launch request submitter, the policy may or may not be saved in the policy repository maintained by the placement manager. Thus, in some cases, a given placement policy may not necessarily be used more than once.

In some embodiments, placement decisions for application execution environments other than guest virtual machines may also or instead be made using placement policies 165. For example, customizable placement policies may be created and enforced for placing operating system instances (to be used for client applications and/or administrative applications of various provider network services) on hosts which do not necessarily have virtualization management software components such as hypervisors installed. In one embodiment, some un-virtualized application execution environments may be instantiated on (or migrated to) hosts outside the provider network based on the applicable placement policies.

Placement Policy Components

FIG. 2 illustrates example elements of a placement policy for guest virtual machines, according to at least some embodiments. Placement policy 200 may include some combination of a policy schema version 201, policy name 203, an identifier 205 of the policy creator or owner, a validity period 207, applicability criteria 209, a virtualization host candidate pool selection rule set 211, a candidate ranking rule set 213, a precedence priority 215, access permissions 217, and parent/child policy pointers 219 in the depicted embodiment. As mentioned earlier, in some embodiments a VCS may publish a schema specification indicating the acceptable languages or formats (e.g., versions of XML, JSON, etc.) in which policies are to be expressed and/or stored. The schema specification may change over time, e.g., as features such as new GVM categories are added to the VCS, and the particular version of the schema with which a given policy complies may be indicated via schema version element 201 in the depicted embodiment. The policy name 203 may comprise a string selected by the creator of the policy, such as "Web-app-W1 policy" or the like. The entity responsible for creating the policy (e.g., either by modifying a pre-existing policy, or by indicating various elements of the policy without using a pre-existing policy as a template) may be indicated in the creator/owner identifier element 205. For example, for client-created policies, the VCS client account identifier or a user identifier associated with a particular VCS client may be used for element 205, while for policies generated by VCS administrators, a generic identifier such as "system" may be used in some implementations.

The validity period 207 may indicate, for example, a start date or timestamp at which the policy is to be made effective, and an end date or timestamp after which the policy is no longer to be enforced. Validity periods may be set, extended or shortened by authorized entities using the VCS programmatic interfaces in various embodiments—e.g., an authorized client may decide to extend a validity period of a policy which appears to be working well. Applicability criteria 209 may indicate the kinds of GVM requests to which the policy is to be applied; examples of different applicability criteria are discussed below in the context of FIG. 3, FIG. 4 and FIG. 5. Rule sets 211 and 213 may indicate factors which are to be considered when generating a candidate pool of virtualization hosts, and when ranking the candidates after the pool has been formed, respectively; examples of such factors are discussed below in the context of FIG. 6.

In some embodiments, several different policies may apply to a given launch request or to a given virtualization host, and respective precedence priorities 215 to be used to resolve conflicts (if any) among the policies may be stored together with the other elements of the policies. In one embodiment, for example, a group of system-defined policies may be designated as high-priority policies which cannot be violated by policies created by individual clients. Such system-defined policies may be assigned a high precedence priority value of 1 (assuming lower integers correspond to higher priorities) in one implementation, for example, while clients may request precedence priorities with values in the range 2-10000. A given client may create multiple placement policies including P1 and P2, with P1 being considered more important from the client's perspective than P2. In such a scenario, the client may assign a precedence priority 10 to P1 and a priority 20 to P2. In one implementation, precedence priorities may be used to indicate whether a given policy is a requirement (from the policy creator's perspective) or a "nice-to-have" feature with respect to a given set of GVMs or hosts.

Access permissions 217 may be used to indicate the set of entities or users who are allowed to view and/or modify the policy. In some embodiments, the permissions may be defined and assigned using an identity management system implemented at the provider network. In one embodiment, at least some placement policies may be related to each other hierarchically—e.g., one policy P-root may be used as the template from which two other more specific policies P-child1 and P-child2 are generated, where the children policies differ from the parent in a subset of elements. In such scenarios, the relationships between the different policies of the hierarchy may be indicated using child or parent pointers 219. For example, instead of duplicating all the common elements of parent policy P-root in P-child1 and P-child-2, a pointer to P-root may be stored in the children policies, together with any elements that differ from the parent policy. It is noted that system-defined defaults may be used for one or more placement policy elements which are not explicitly specified by the policy creator in various embodiments—for example, a default validity period of 30 days may be set for a policy for which no explicit validity period is specified. In various embodiments, placement policies with one or more elements not shown in FIG. 2 may be implemented, or one or more of the illustrated elements may not be included in at least some placement policies.

Applicability Criteria Examples

Figure 3:
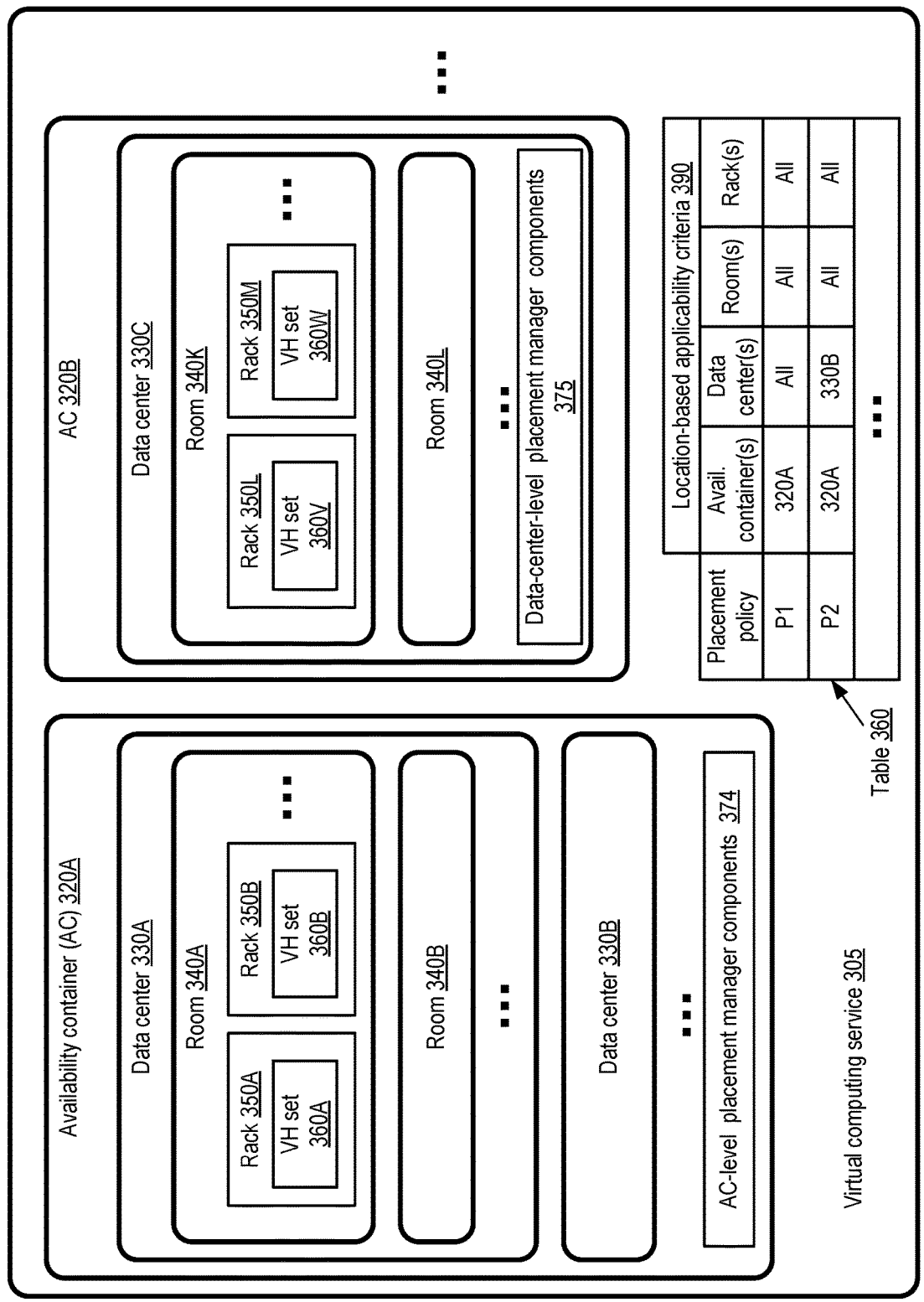
FIG. 3 illustrates examples of location-based applicability criteria for placement policies, according to at least some embodiments.

FIG. 3 illustrates examples of location-based applicability criteria for placement policies, according to at least some embodiments. In the depicted embodiment, the resources of VCS 305 are distributed among a plurality of availability containers (ACs) such as AC 320A and 320B. As mentioned earlier, the resources in a given availability container 320 may be engineered such that they are insulated from failures in other availability containers. Because a failure in one availability container is not expected to result in a correlated failure in any other availability container, fault-tolerant applications may sometimes be implemented suing redundant sets of components located in different availability containers. A given availability container may comprise at least a respective portion of one or more data centers. In the depicted example, AC 320A includes data centers 330A and 330B (which may themselves be geographically distributed to improve intra-availability-container fault-tolerance), while AC 320B includes data center 330C. Each data center 330 may in turn comprise one or more rooms, such as rooms 340A and 340B within data center 330A, and rooms 340K and 340L within data center 330C. Each room may contain numerous server racks, such as racks 350A and 350B in room 340A, and racks 350L and 350M in room 340K. Each rack may be used for a set of virtualization hosts, such as VH set 360A at rack 350A, VH set 360B at rack 350B, VH set 360V at rack 350L, and VH set 360W at rack 350M. In the depicted embodiment, various components or instances of the placement manager (such as the policy enforcement modules 186 shown in FIG. 1) may be distributed among the availability containers and the data centers—e.g., placement manager components 374 may be configured at the availability container 320A, and placement manager components 375 may be set up at data center 330C.

As indicated in table 360, location-based applicability criteria 390 may be defined for placement policies at various granularities in the depicted embodiment. For example, placement policy P1 applies to GVMs at all virtualization hosts of availability container 320A, regardless of the specific rack, room, or data center at which the hosts are located. In contrast, placement policy P2 applies to hosts located in data center 330B of availability container 320A, and may not be applicable to hosts located in other data centers such as 330A of the same availability container. Such location-specific policies may be particularly useful when decisions to decommission or shut down specific data centers, rooms or racks, either temporarily or permanently, are made at the VCS. It is noted that some location-based policies may be identified for a given launch request (or a given migration operation) only after some indication of the location of the candidate hosts is obtained by the placement manager. For example, in some embodiments each GVM launch request may be associated with a corresponding availability container, in which case the set of placement policies associated with that availability container may be included in the set relevant policies for any launch request for which that availability container is to be used.

Figure 4:
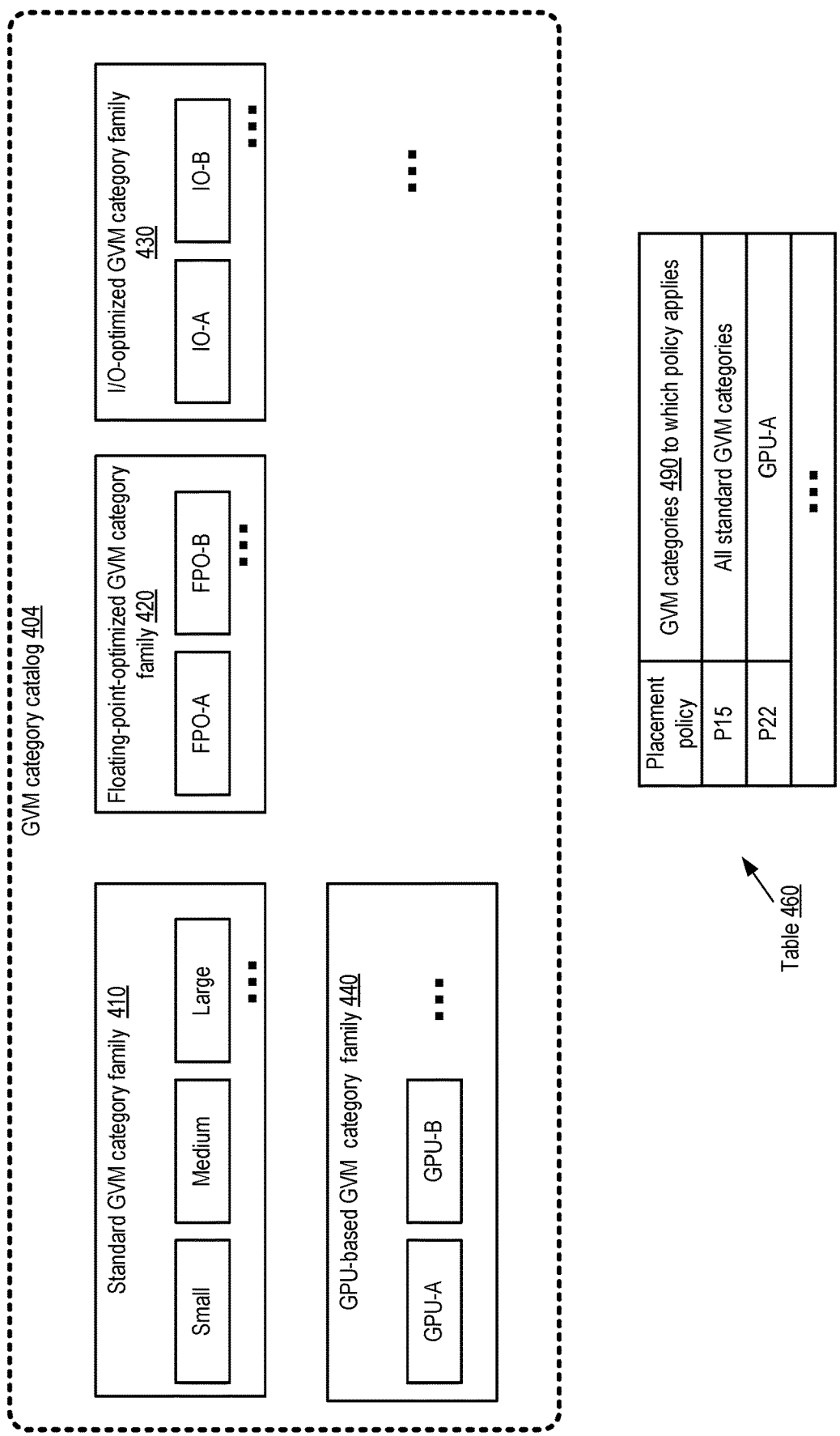
FIG. 4 illustrates examples of supported categories of guest virtual machines for which respective placement policies may be generated, according to at least some embodiments.

In some embodiments a VCS may allow a client to specify, in a launch request, a selected category from among numerous supported categories of guest virtual machines, and the placement policies identified for the launch request may depend on the category specified by the client. FIG. 4 illustrates examples of supported categories of guest virtual machines for which respective placement policies may be generated, according to at least some embodiments. In the depicted embodiment, GVM category catalog 404 of a VCS includes a number of different families of guest virtual machines. Each family consists of a plurality of categories of guest virtual machines; the members of a given family may in some cases all be optimized for particular kinds of applications but may differ from one another in performance capacity, billing rates, and the like. A standard GVM category family 410 comprises general-purpose GVM categories "small", "medium", and "large" (with the names reflecting relative performance capability levels), suitable for various common applications such as web hosting, software development, office applications and the like. GVMs belonging to the standard family 410 may typically be configured on commodity virtualization hosts which do not require any custom hardware in the depicted embodiment.

GVM categories FPO-A and FPO-B of floating-point-optimized family 420 may be suited for high-end applications involving intensive scientific computations, such as applications associated with astronomy simulations, physics simulations and the like. Some applications may require very high rates of I/O (input-output) operations, and instances of the I/O-optimized GVM category family 430 (such as category IO-A or IO-B) may be established for VCS clients with such applications. Applications which can benefit from using graphical processing units (GPUs) may be deployed at guest virtual machines belonging to GPU-based GVM category family 440, such as GPU-A or GPU-B categories. Additional category families beyond those shown in FIG. 2 may be supported at some VCSs in various embodiments, and some of the category families indicated in FIG. 4 may not be available in some embodiments.

As indicated in Table 460, some placement policies may be applicable to selected GVM categories 490. For example, policy P15 applies to all the categories of the standard GVM category family 410, while policy P22 applies to GVMs belonging to the GPU-A category of family 440. In at least one embodiment, default placement policies may be defined at the VCS for each supported GVM category, with clients allowed to override at least some of the default policies (e.g., by assigning higher precedence priorities to the non-default policies).

Figure 5:
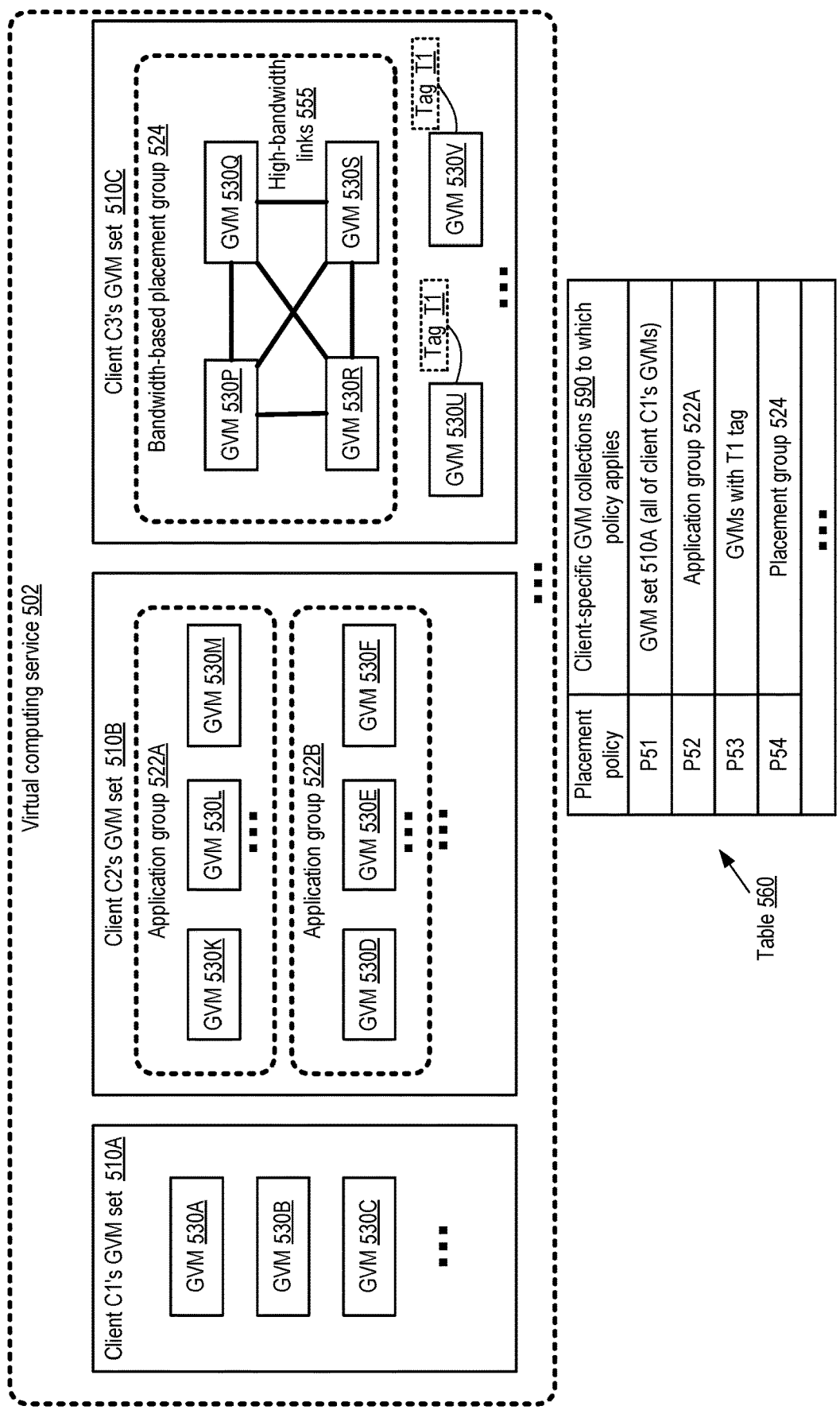
FIG. 5 illustrates examples of placement policies applicable to client-specific collections of guest virtual machines, according to at least some embodiments.

FIG. 5 illustrates examples of placement policies applicable to client-specific collections of guest virtual machines, according to at least some embodiments. The guest virtual machines of VCS 502 may be logically subdivided into a number of groups or collections, with each collection being associated with at least one VCS client in the depicted embodiment. The GVMs allocated to three different clients C1, C2 and C3 are shown. Within a given client's GVM collection, a number of sub-groups may be defined by the client. An application group may be defined by a client in some embodiments, e.g., as a label which can be indicated as an attribute of a launch request, to refer to all the GVMs being used at various tiers of a particular application. For example, client C2 has organized GVM set 510B into application groups 522A and 522B. Application group 522A includes GVMs 530K, 530L and 530M, while application group 522B includes GVMs 530D, 530E and 530F.

In one embodiment, clients may be able to specify, for a set of GVMs designated as members of a placement group, a desired property of a physical location of one GVM of the placement group relative to the physical location of another GVM of the placement group. For example, for some clustered applications in which the latency or bandwidth of messages transmitted from one cluster node to another has to meet a particular criteria, a placement group which requires different cluster nodes to be located no more than X meters from one another may be defined. When requesting a launch of a new GVM, a placement group for the new GVM may be specified as a request attribute in some embodiments. In the depicted example, client C3's GVMs 530P, 530Q, 530R and 530S all belong to a bandwidth-based placement group 524. The placement of the GVMs of placement group 524 may be further constrained in the depicted embodiment, in that the virtualization hosts selected for the placement group members may have to be linked to one another using special high-bandwidth links 555 which may only be available at some data centers of the provider network.

In the depicted embodiment, clients may also assign arbitrary tags (such as tag T1) to one or more GVMs (such as GVM 530U or 530V), and the set of GVMs to which a particular tag is assigned may form another distinguishable GVM collection for which a particular placement policy may be defined. Some clients, such as C1 in the depicted example, may not create sub-groups such as application groups or placement groups of their GVMs, and may not utilize tags; in such cases, client-specific placement policies may be applicable to all the GVMs established on behalf of the client.

In the depicted embodiment, four examples of placement policies whose applicability is limited to client-specific GVM collections 590 are shown in table 560. Policy P51 is applicable to GVM set 510A, comprising all the GVMs of client C1. Policy P52 applies to application group 522A of client C2. Policy P53 applies to GVMs with which tag T1 is associated (e.g., GVMs 530U and 530V). Placement policy P54 is applicable to placement group 524 defined by client C3.

The types of applicability criteria shown in FIG. 3, FIG. 4 and FIG. 5 may be combined in some embodiments. For example, a given placement policy may be applied to all of client C1's GVMs which belong to standard GVM category "small" and are instantiated within a particular availability container 320A in one embodiment, combining aspects of client-specific applicability, location-based applicability, and GVM category-based applicability. In at least some embodiments, additional dimensions of applicability may be defined for some placement policies. For example, in embodiments in which temporal applicability is supported, a particular placement policy P-k may be applied to those of a client's launch requests which are received during one specified time period on any given day (e.g., between 8 AM and 5 PM), and a different placement policy P-1 may be applied to requests received outside that time period (e.g., between 5 PM and 8 AM). In some embodiments, different placement policies may be defined based on the total number of GVMs allocated currently to a client—e.g., policy P-s may apply to a client on whose behalf less than one thousand GVMs have been established, and policy P-t may apply to clients on whose behalf more than one thousand GVMs have been set up.

Candidate Host Selection and Ranking

Figure 6:
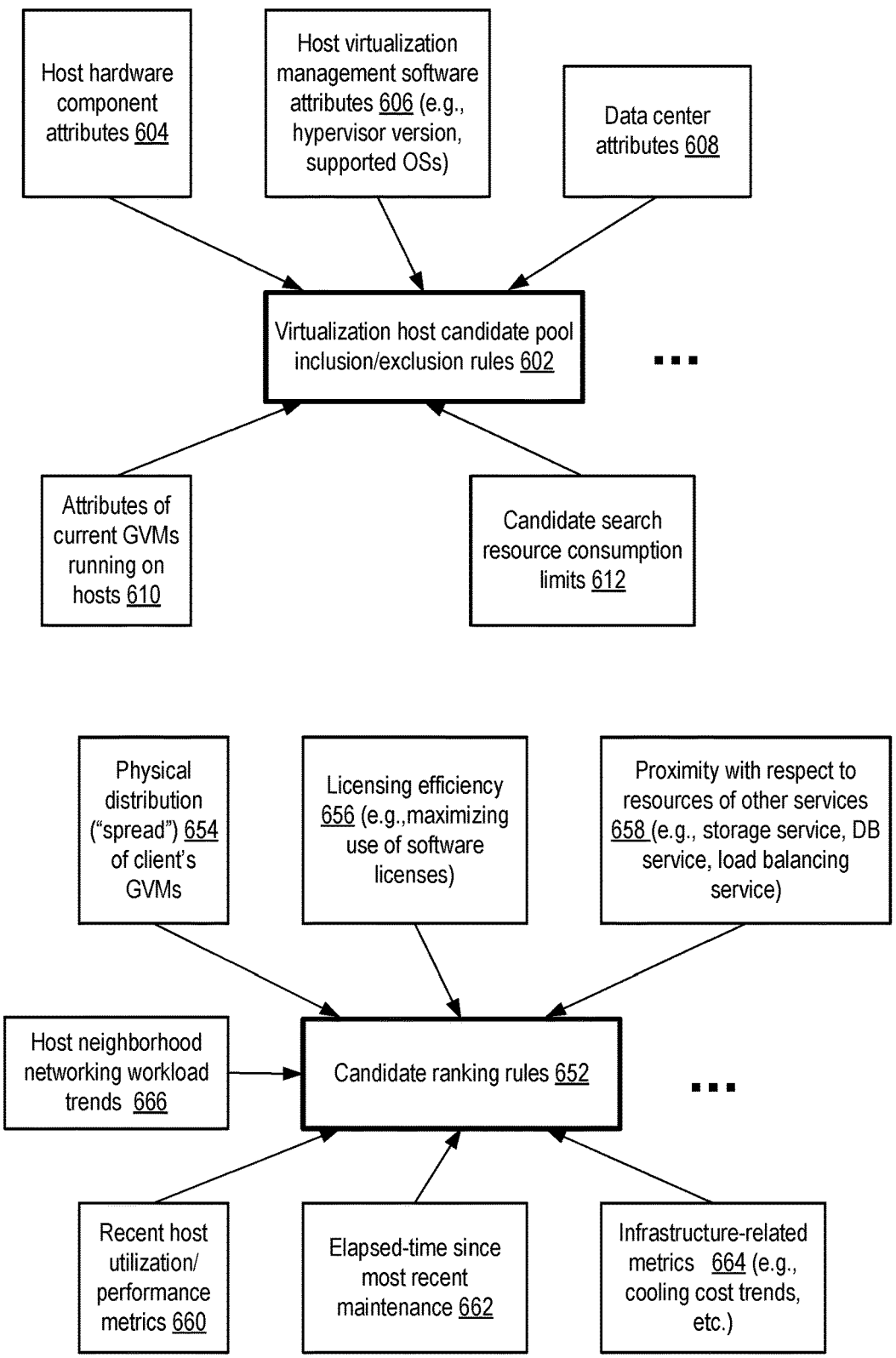
FIG. 6 illustrates examples of factors that may be taken into account to select members of candidate pools of virtualization hosts for placing a guest virtual machine, and to rank members of such candidate pools, according to at least some embodiments.

FIG. 6 illustrates examples of factors that may be taken into account to select members of candidate pools of virtualization hosts for placing a guest virtual machine, and to rank members of such candidate pools, according to at least some embodiments. In some embodiments, the rationale for selecting a particular host as a candidate for a GVM with specified characteristics or requirements may be based on whether it is even possible for a GVM with those characteristics to be instantiated successfully at that host, so the process of identifying candidate hosts may comprise eliminating or excluding hosts that cannot support the requested GVM regardless of the possible advantages or disadvantages of doing so. Some inclusion or exclusion rules 602 for virtualization host candidate pools may be based on host hardware components attributes 604 in some embodiments. Thus, some categories of guest virtual machines may only be compatible with certain hardware architectures—e.g., a minimum of N1 processor cores with clock speeds of G1 GHz, and supporting a 64-bit architecture may be a prerequisite for launching a GVM of category Cat1, while N2 cores running at clock speeds of G2 GHz and supporting a 32-bit architecture may be required for category Cat2 GVMs. Attributes of the virtualization management software stack 606 installed at a given virtualization host may also determine whether than host can be considered a candidate. For example, some GVMs may require a particular version of a hypervisor or a privileged domain operating system to be running at the virtualization host, and an attempt to launch such a GVM at a host with the wrong version of the hypervisor or the wrong operating system version may simply fail. Some GVMs may have to be launched using a particular virtual machine image, which may not be readable or executable at a subset of the virtualization host fleet, thereby eliminating that subset of hosts from the candidate pool for such GVMs.

In some cases, some types of GVMs may not be co-located at a host at which a GVM of another type (or the same type) is currently running—for example a GVM of category Cat1 may be incompatible with a GVM of category Cat2 because both categories may attempt to hold on to a shared resource such as a GPU for long time slots. Thus, attributes 610 of other GVMs running at a given host may disqualify that host from consideration as a candidate. In one embodiment, the VCS may allow clients to request single tenancy for a GVM—that is, a requested GVM may only be launched at a host at which no other GVM is running. Single-tenancy requirements may eliminate at least some hosts from consideration as candidates. In at least one embodiment, it may not be feasible to launch a given GVM at a particular data center—for example, GVMs of that category may be intended to remain online for months or years, but the data center may have been selected for decommissioning in the next few weeks. In another example of data center attributes 608 that may be taken into account when selecting candidate virtualization hosts, a given data center may not have sufficiently-fast network links to be able to sustain the traffic levels associated with a requested GVM. In one embodiment, a limit may be placed on the resources that are to be consumed in selecting candidate VHs for a GVM launch request. Candidate search resource consumption limits 612 may, for example, limit the maximum number of virtualization hosts that are to be considered as possible candidates for a given GVM launch request to say, 10000 or 100000 in some embodiments, and may therefore also influence the exclusion or inclusion of hosts in the candidate pool.

Factors that may be evaluated to rank different candidate hosts for a GVM according to candidate ranking rules 652 may include, for example, the "spread" or physical distribution 654 of the requesting client's GVMs. For availability and failure tolerance reasons, some clients may wish to maximize the physical separation of their GVMs to the extent possible, based on the assumption that the probability of correlated failures at two hosts may vary inversely with the distance between the two hosts. The relative importance of the different ranking factors to be used to select a target host for a GVM may be indicated programmatically by the policy creator in some embodiments—for example, for client C1, increasing or maximizing spread may be a much higher priority than it is for client C2, so respective policies with ranking rules that assign different weights to maximizing spread may be used for C1 and C2. Licensing efficiency 656 may be taken into account when ranking candidate hosts for certain types of GVMs in the depicted embodiment. With respect to some types of software licenses (e.g., licenses from third-party vendors of database software or other application software), in some cases each license may have a minimum term (e.g., a year) and may be designated for a specific host. When deciding where to place a given GVM which is expected to use a licensed software product LSP-1, those hosts for which a currently unused or valid license for LSP-1 exists may be ranked higher than hosts which do not LSP-1 licenses. A host may have an unused license because, for example, a different GVM that required such a license may have been running earlier on that host, and that different GVM may have been terminated before the license term expired. In various embodiments, a group of candidate virtualization hosts may be ranked so as to maximize the use of existing licenses which have been obtained for some or all of the candidates.

Proximity 658 with respect to resources of other services of the provider network may also be used to rank virtualization hosts in some embodiments. For example, in one embodiment, a given GVM may be expected to use storage objects (e.g., a volume exposing a block device interface) from a particular storage service of the provider network, and those virtualization hosts which happen to be located in close proximity with a volume-providing storage device of that service may be preferred for storage performance reasons in the ranking procedure. Proximity to components of other services of a provider network, such as a database service or a load balancing service, may also be taken into account to rank the hosts in various embodiments.

In some embodiments, when ranking candidate hosts, recent measurements of trends in network workload levels (e.g., based on traffic measurements or network link utilization measurements) in the network vicinity of the hosts may be used to rank hosts as more suitable or less suitable for a given GVM. Based on such host neighborhood network workload trends 666, a host in a quieter or less-trafficked portion of the VCS network may be ranked higher than hosts in busier portions of the network. Recent host-level resource utilization and/or performance metrics 660 may be used for ranking rules 652 in some embodiments. The elapsed time 662 since a host's most recent maintenance window (e.g., since the host was most recently rebooted for maintenance) may be taken into account as a ranking factor in some embodiments, e.g., under the assumption that hosts which have been rebooted more recently are less likely to be rebooted again in the near future and are therefore preferable. In one embodiment, metrics 664 of infrastructure costs (e.g., costs associated with heating, cooling, physical security and the like) may be kept for different sets of virtualization hosts, and the hosts which are likely to incur lower infrastructure costs may be ranked higher. In at least some embodiments, respective numerical ranking metrics may be computed for each ranking factor for a given host, and combined to obtain an aggregate ranking metric. The aggregate metrics of different candidates may be compared to identify the best-suited target host for a given GVM.

Example Programmatic Interface

Figure 7:
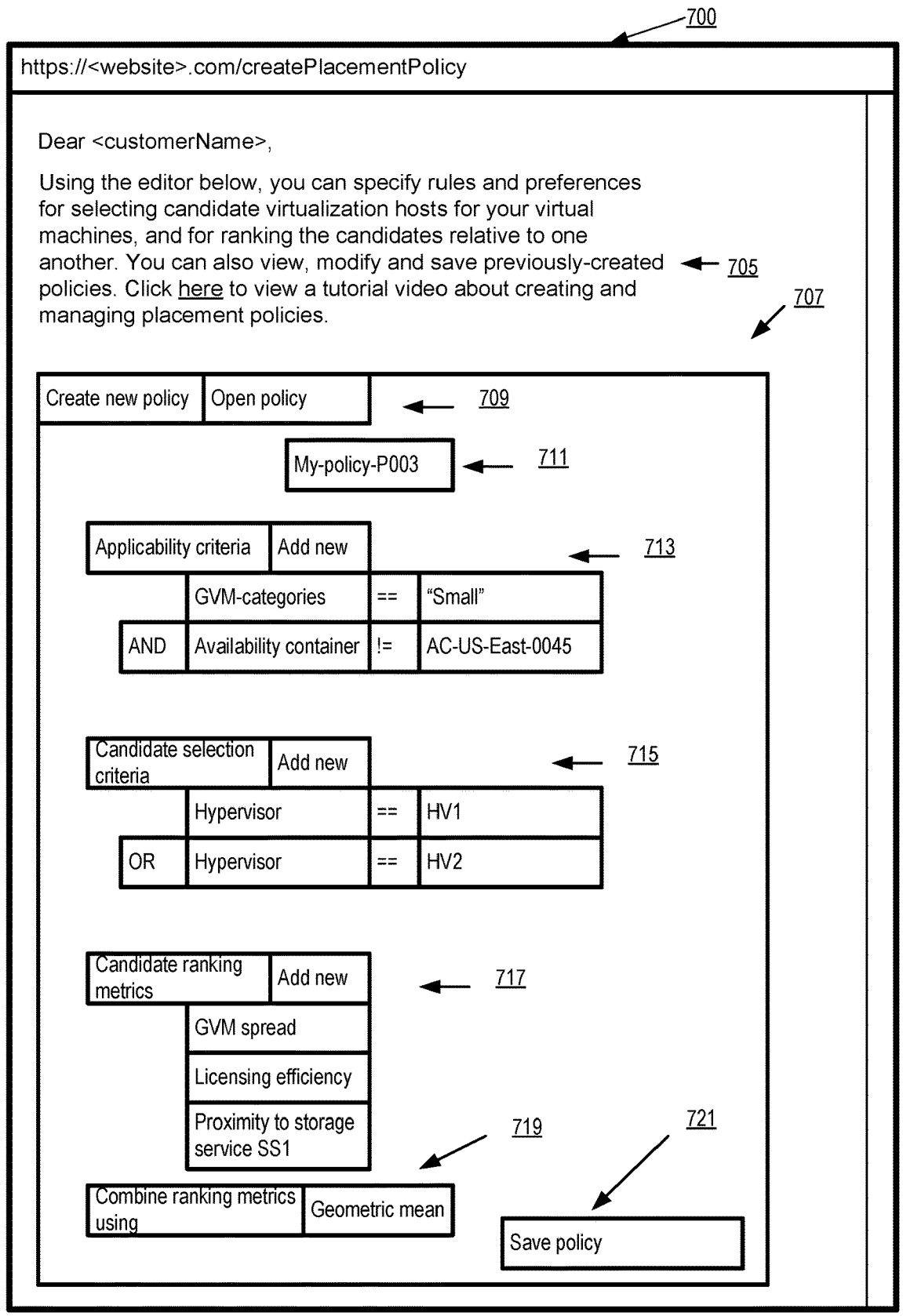
FIG. 7 illustrates an example web-based programmatic interface which may be used to generate or edit placement policies for guest virtual machines, according to at least some embodiments.

As mentioned earlier, the placement manager may implement a number of programmatic interfaces in some embodiments for interactions with placement policy creators. FIG. 7 illustrates an example web-based programmatic interface which may be used to generate or edit placement policies for guest virtual machines, according to at least some embodiments. As shown, the interface comprises a web page 700 including an introductory message area 705 and a graphical editing tool 707. The message area provides an overview of the purpose of the web page 700 and a link to a tutorial video about the creation and management of placement policies.

Within editing tool 707, web controls 709 may be used to generate a new policy or to edit an existing policy to which the user has been granted the appropriate access permissions. Element 711 identifies the policy which is currently being edited. One or more applicability criteria for the policy may be specified in region 713. For each criterion, one or more clauses or predicates may be specified, and multiple clauses may be combined using Boolean operators such as "AND" or "OR" in the depicted embodiment. A given clause may contain one element indicating a respective attribute or property (e.g., "GVM category" or "Availability container"), a relational operation (e.g., "==", signifying equality, or "!=" signifying inequality), and a value or value range (e.g., a value of "Small" for the "GVM category" property, and "AC-US-East-0045" for the "Availability container" property) may be indicated using the editing tool 707.

In region 715 of web page 700, a client may specify virtualization host candidate selection criteria or rules. In the depicted example, criteria for including a virtualization host in the candidate pool for requests associated with the "Small" category of GVMs in the availability containers which meet the inequality criterion of region 713 may include that the virtualization host have the hypervisor version HV1 or HV2 installed. As in the case of the applicability criteria, multiple criteria for inclusion in the candidate pool may be combinable using Boolean operators in the depicted embodiment.

With respect to ranking candidate pool members, region 717 of web page 700 may be utilized to provide a list of ranking metrics, and control 719 may be used to indicate how the numerical values corresponding to the individual ranking metrics are to be combined into a single aggregated ranking metric. In the depicted example, a client has selected ranking metrics for GVM spread, licensing efficiency and proximity to a storage service SS1, and indicated that the geometric mean of the individual metrics is to be used as the aggregate metric. Web control 721 may be used to save the policy being edited or created. In various embodiments, drop-down menus or other controls may be provided to allow clients to select entries to be included in the applicability criteria, the candidate selection criteria or the ranking criteria. Additional controls may be provided to indicate validity periods, precedence priorities, access permissions and/or other elements of placement policies in some embodiments. Instead of or in addition to a web-based interface similar to that shown in FIG. 7, APIs, command-line tools, or graphical user interfaces that do not comprise web pages may be provided in some embodiments for placement policy creation, viewing and editing. Programmatic tools to compare existing policies (e.g., the equivalent of a "diff" command) may also be supported in some embodiments at the VCS.

Policy Caching

Figure 8:
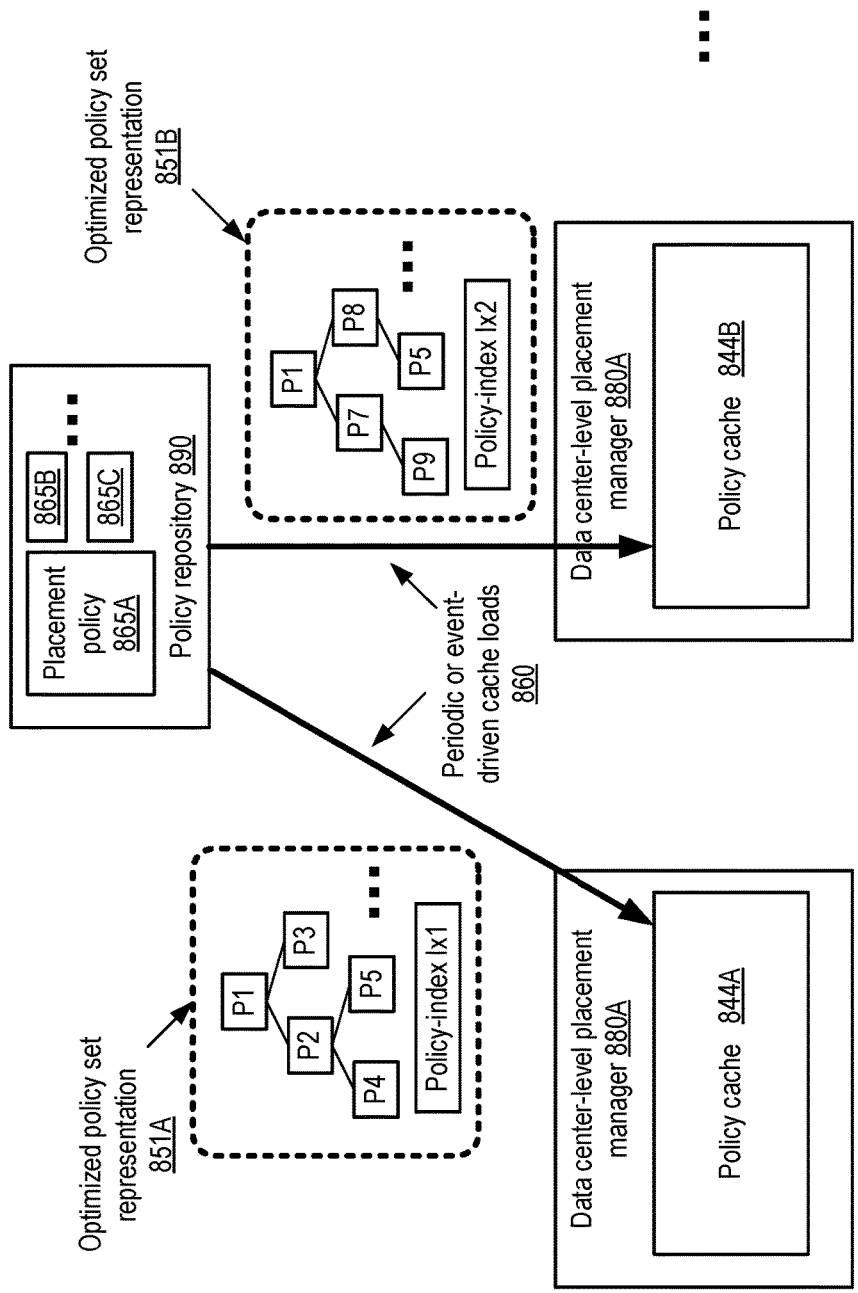
FIG. 8 illustrates the use of policy caches at nodes of a distributed placement manager, according to at least some embodiments.

When a launch request for a GVM is received at the VCS control-plane, a corresponding placement decision may have to be made fairly quickly in various embodiments. Caching of policies within main memory may be used to speed up the real-time responses of policy enforcement modules of the placement manager in some embodiments. In various embodiments, the responsibilities of placement policy enforcement may be distributed among a plurality of nodes of the placement manager: for example, respective placement manager nodes may be established in every availability container or in every data center. FIG. 8 illustrates the use of policy caches at nodes of a distributed placement manager, according to at least some embodiments.

Approved placement policies 865, such as 865A, 865B or 865C may initially be placed in a policy repository 890 in the depicted embodiment. Periodically or on demand, an optimized policy set representation (e.g., respective tree-structured representations 851A and 851B) may be generated from at least a subset of the stored policies 865 and transmitted to in-memory caches located at respective distributed placement manager components. In the depicted embodiment, respective policy caches 844A and 844B may be maintained in main memory at the servers at which data-center level placement manager components 880A and 880B are executed. The set of policies cached at different components 880 may not be identical—e.g., a set of policies relevant to the corresponding data center may be sent to each data-center level placement manager component. In the depicted example, policies P1-P5 are stored in local cache 844A, while policies P1, P7, P9, P8 and P5 are stored in local cache 844B. The tree structured representations may correspond to decision trees that have to be traversed to make placement decisions—e.g., P1 may be evaluated and applied first at component 880A, then P2 may be applied if it is relevant to the request being considered, and so on. In some implementations, respective policy indexes such as IX1 or IX2 may be generated and provided to the distributed placement manager components. Such indexes may speed up the process of searching for policies based on client ID, GVM category, and so on. In some embodiments an executable program corresponding to one or more placement policies may be pre-compiled at the policy repository or at some other component of the VCS, and transmitted to the distributed placement policy components 880. For example, a byte-code version of the set of placement policies may be created in one implementation. At a given distributed placement manager component 880, such an executable version may be run with a given launch request's attributes provided as input parameters. The executable version of the policies may provide a ranked candidate virtualization host list as its output, and/or identify a particular virtualization host to be used for the request.

Placement Decisions for Hosts Outside the Provider Network

Figure 9:
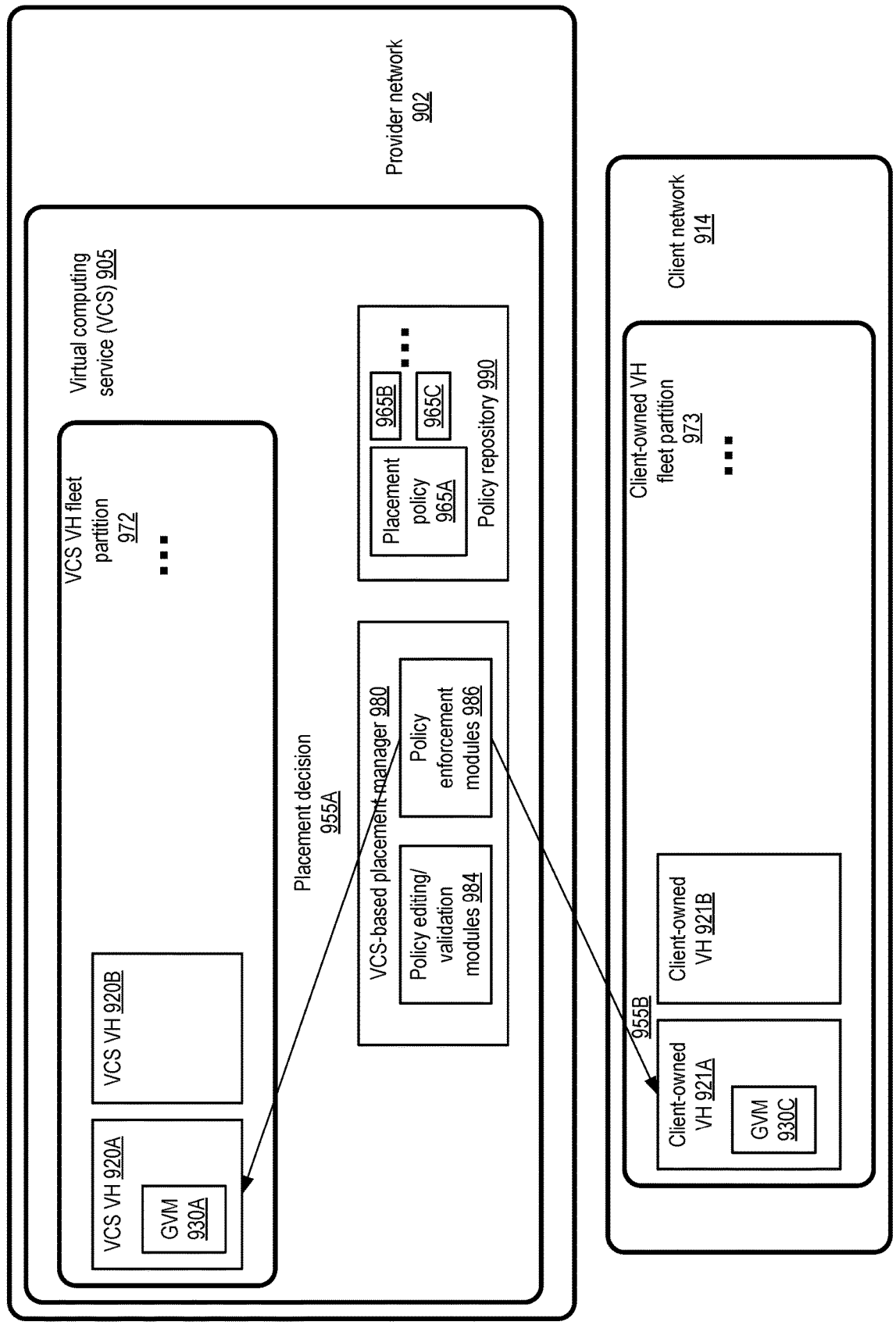
FIG. 9 illustrates an example policy-driven placement manager which, while implemented using resources of a provider network, may be used for placement decisions at a client network, according to at least some embodiments.

In some embodiments, techniques for enforcing policy-drive placement policies of the kind described above may be utilized for a virtualization host fleet which comprises at least some hosts located outside the provider network. FIG. 9 illustrates an example policy-driven placement manager which, while implemented using resources of a provider network, may be used for placement decisions at a client network, according to at least some embodiments. As shown, the fleet of available virtualization hosts from which VCS-based placement manager 980 can select includes a VCS fleet partition 972 and a client-owned fleet partition 973. VCS fleet partition 972 comprises VHs 920A and 920B, which may be located in one or more data centers of provider network 902, while client-owned fleet partition 973 comprises client-owned virtualization hosts 921A and 921B located within client network 914. In the depicted embodiment, a client may provide various types of information about the set of client-owned virtualization hosts for which placement decisions are to be managed by the VCS placement manager, including for example network addresses, administrative credentials, and the like. In one embodiment the VCS-based placement manager 980 may run a suite of validation tests to verify that it can perform the operations required to launch virtual machines at the client-owned fleet partition 973. The results of two example placement decisions (which may have been made on behalf of the same VCS client, or on behalf of different VCS clients) made by policy enforcement modules 986 are illustrated in FIG. 9. In placement decision 955A, virtualization host 920A of the VCS is selected for GVM 930A based on applicable policies, while in placement decision 955B, virtualization host 921A at client network 914 is selected for GVM 930B based on applicable policies.

In some embodiments in which external virtualization hosts are managed with the help of a placement manager 980 implemented as part of a network-accessible service of the provider network, one of the attributes of a launch request for a GVM may indicate whether the GVM is to be instantiated at a VCS VH 920 or a client-owned VH 921. In other embodiments, the decision as to whether a VCS VH 920 is to be used or whether a client-owned VH is to be used may be made by the placement manager 980 based on policies 965. In some embodiments in which multiple GVMs can be requested in single launch request, one or more applicable policies may result in the selection of some hosts at the VCS and some hosts at the client network for the same launch request. The policy editing and validation modules 984 and the policy repository 990 may both be implemented using VCS resources in the depicted embodiment. Different clients may specify respective fleet partitions for which GVM placement decisions are to be made using the VCS placement manager 980 in some embodiments. In one embodiment, virtualization hosts located in third-party premises (e.g., data centers that are owned or managed by entities other than the provider network operator and other than VCS clients) may be included in the fleet from which target virtualization hosts can be identified by the placement manager. In some embodiments, the placement manager may expose programmatic interfaces enabling authorized clients and/or third parties to extend or modify the policy creation and implementation algorithms, at least with respect to a subset of the virtualization host fleet partitions. For example, in one embodiment in which such an extensible framework for placement policies is supported, a particular client may customize the core placement manager logic, and use the customized placement manager for the client's own virtualization hosts or for a fleet that includes some VCS hosts and some non-VCS hosts. In at least one embodiment, a client may utilize a VCS-based placement manager 980 for client-premise virtualization hosts alone (i.e., for a fleet which does not include virtualization hosts within provider network 902).

Figure 10:
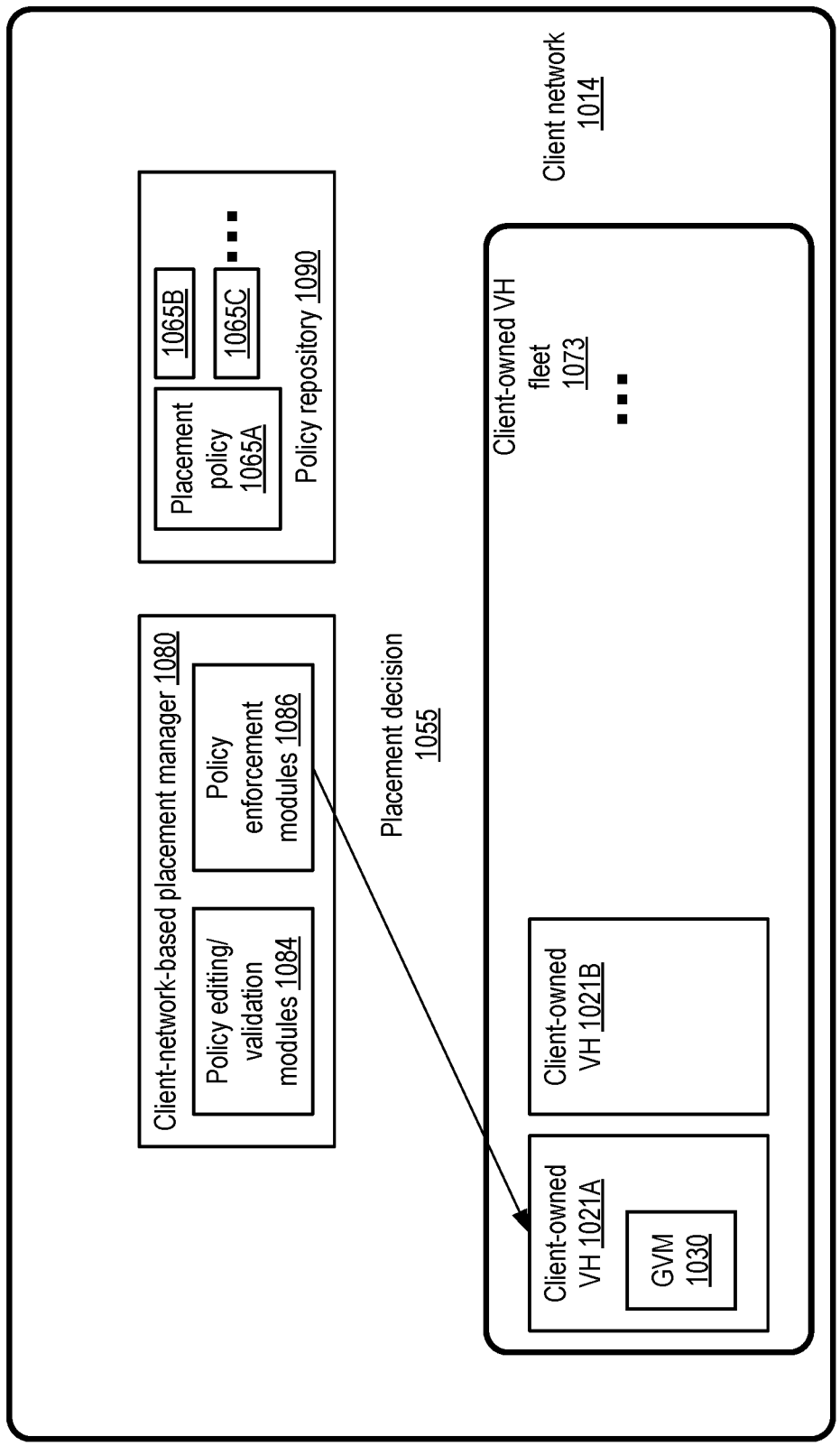
FIG. 10 illustrates an example policy-driven placement manager which may be executed using resources of a client network, according to at least some embodiments.

In contrast to the scenario illustrated in FIG. 9, in some embodiments all the components of a placement manager may be implemented or executed outside the provider network. FIG. 10 illustrates an example policy-driven placement manager which may be executed using resources of a client network, according to at least some embodiments. The placement manager logic may be packaged in the form of an executable program which can be installed on client-owned computing devices, for example. The policy editing and validation modules 1084 and the enforcement modules 1086 may be executed at client-owned computer servers, and the contents of policy repository 1090 may be stored at storage devices of client network 1014 in the depicted embodiment. In the depicted embodiment, a policy-based decision 1055 made by the enforcement modules 1086 has results in the launch of GVM 1030 on client-owned VH 1021A of VH fleet 1073.

In the placement manager implementation mode illustrated in FIG. 10, the placement policies 1065 (e.g., 1065A or 1065B) generated and used for different clients may be extensively customized based on the clients' specific placement-related goals and requirements. For example, the kinds of request attributes which are used to select applicable policies at one client network may not overlap at all with the kinds of request attributes used at another client's network, and completely different factors may be used by different clients for virtualization host candidate selection and ranking.

Methods for Supporting Customized Placement Policies

Figure 11:
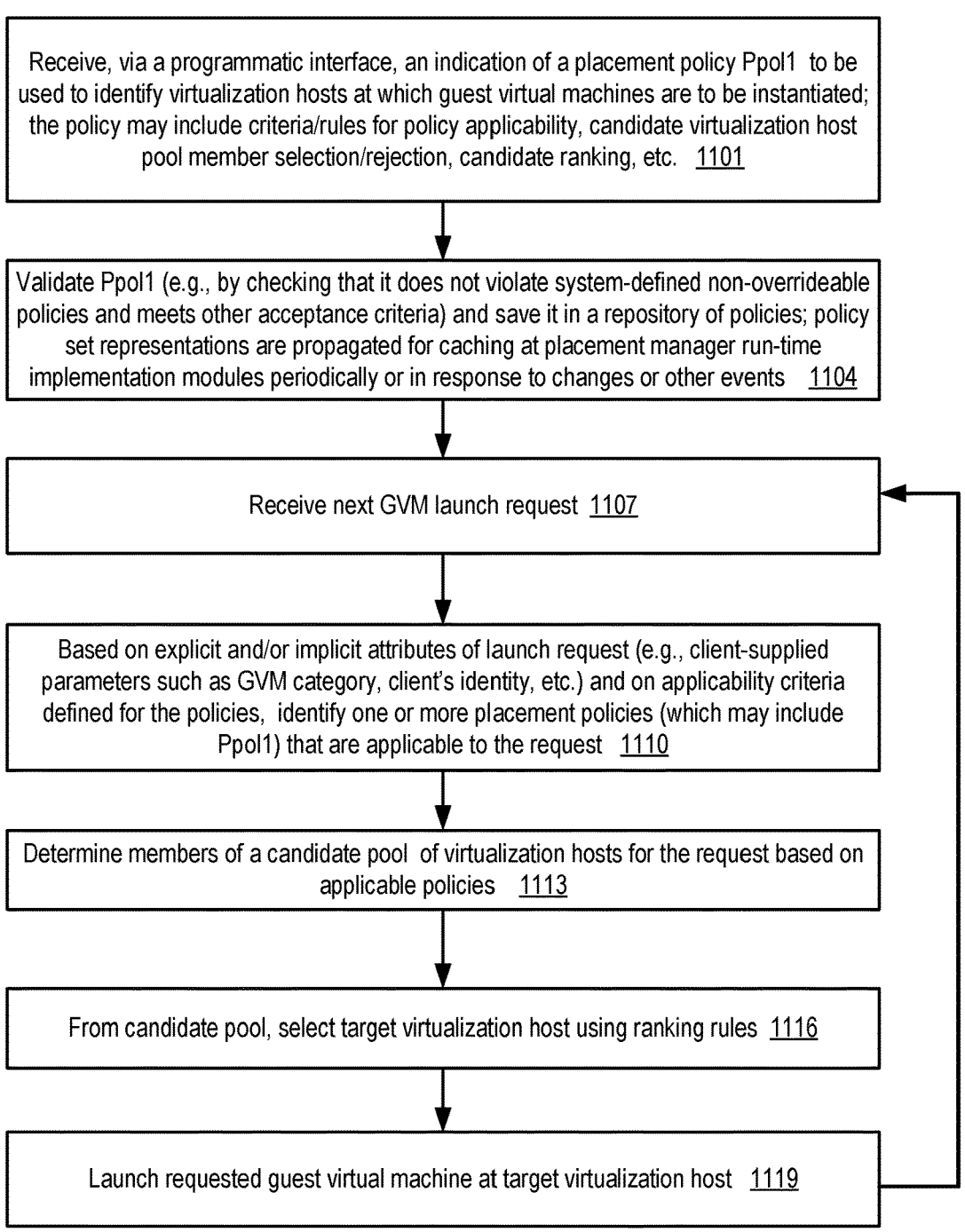
FIG. 11 illustrates aspects of operations that may be performed to support customized policies for selecting virtualization hosts for virtual machines, according to at least some embodiments.

FIG. 11 illustrates aspects of operations that may be performed to support customized policies for selecting virtualization hosts for virtual machines, according to at least some embodiments. As shown in element 1101, an indication of a placement policy Ppol1 to be used to select virtualization hosts for guest virtual machines may be received via a programmatic interface, e.g., at a placement manager of a virtual computing service of a provider network. PPol1 may include a number of elements, including for example applicability criteria, a set of rules for determining members of a pool of candidate virtualization hosts, and/or a set of rules or criteria for ranking the candidates relative to each other. In some embodiments, one or more of the elements of PPol1 may be specified using a web-based programmatic interface, a set of APIs, a command-line tool or a GUI.

A number of validation operations may be performed to ensure that Ppol1 meets one or more acceptance criteria (e.g., the syntax in which the policy elements are specified may be checked with respect to a supported policy schema, the compatibility of PPol1 with respect to system-defined policies which cannot be overridden may be verified, and so on) (element 1104). PPol1 may be stored in a repository of accepted policies if it meets the acceptance criteria. Optimized representations of at least a subset of the repository's policies may be distributed among various placement management components responsible for responding to GVM launch requests in some embodiments. For example, some subset or all of the policies may be cached in the local memories accessible from various policy enforcement modules at which run-time placement decisions are made in some embodiments. In one embodiment, an executable version (e.g., a byte-code version, or a compiled version) of relevant placement policies may be cached at various computing devices used for policy enforcement.

When the next GVM launch request is received at a particular policy enforcement component (element 1107), a set of placement policies including Ppol1 that are applicable to the request may be identified (element 1110), e.g., based at least in part on the policies' applicability criteria and/or on request attributes such as the requesting client's identity, the type of GVM requested, and so on. Using the applicable policies, a pool of candidate virtualization hosts for the request may be identified (element 1113). From the candidate pool, a particular virtualization host may be selected as the target for the requested GVM based on the ranking rules indicated in the applicable policies (element 1116). The requested GVM may be launched at the target host (element 1119). Operations corresponding to elements 1107 onwards may be repeated for various GVM launch requests. In some embodiments, in addition to being used for selecting hosts for new GVMs, the placement policies may also be used to identify destinations to which existing GVMs should be migrated, e.g., using either reboot migration or live migration.

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of enabling the creation and enforcement of customizable placement policies for guest virtual machines may be useful in a variety of environments. Large virtualized computing services may serve hundreds of thousands of clients, for each of whom numerous guest virtual machines may have to be launched using resources distributed among dozens of data centers spread around the world. The placement needs and preferences of some clients may differ substantially from those of others, and the equipment and operating conditions of different portions of the service network may change over time. For example, various sets of virtualization hosts may need to be taken offline eventually for maintenance or other reasons without disrupting existing long-running client applications; placement policies that tend to avoid the selection of such deprecated hosts for new virtual machines may help to gradually move client workloads away from the deprecated hosts. Separating the specification of placement rules from the enforcement logic for those rules may help to simplify the implementation of guest virtual machine launch operations considerably. Placement policies that can be set and modified (e.g., by editing XML documents or JSON objects) without requiring code changes to the control-plane of the virtual computing service may provide substantial flexibility with respect to meeting capacity management and resource utilization goals.

Illustrative Computer System

Figure 12:
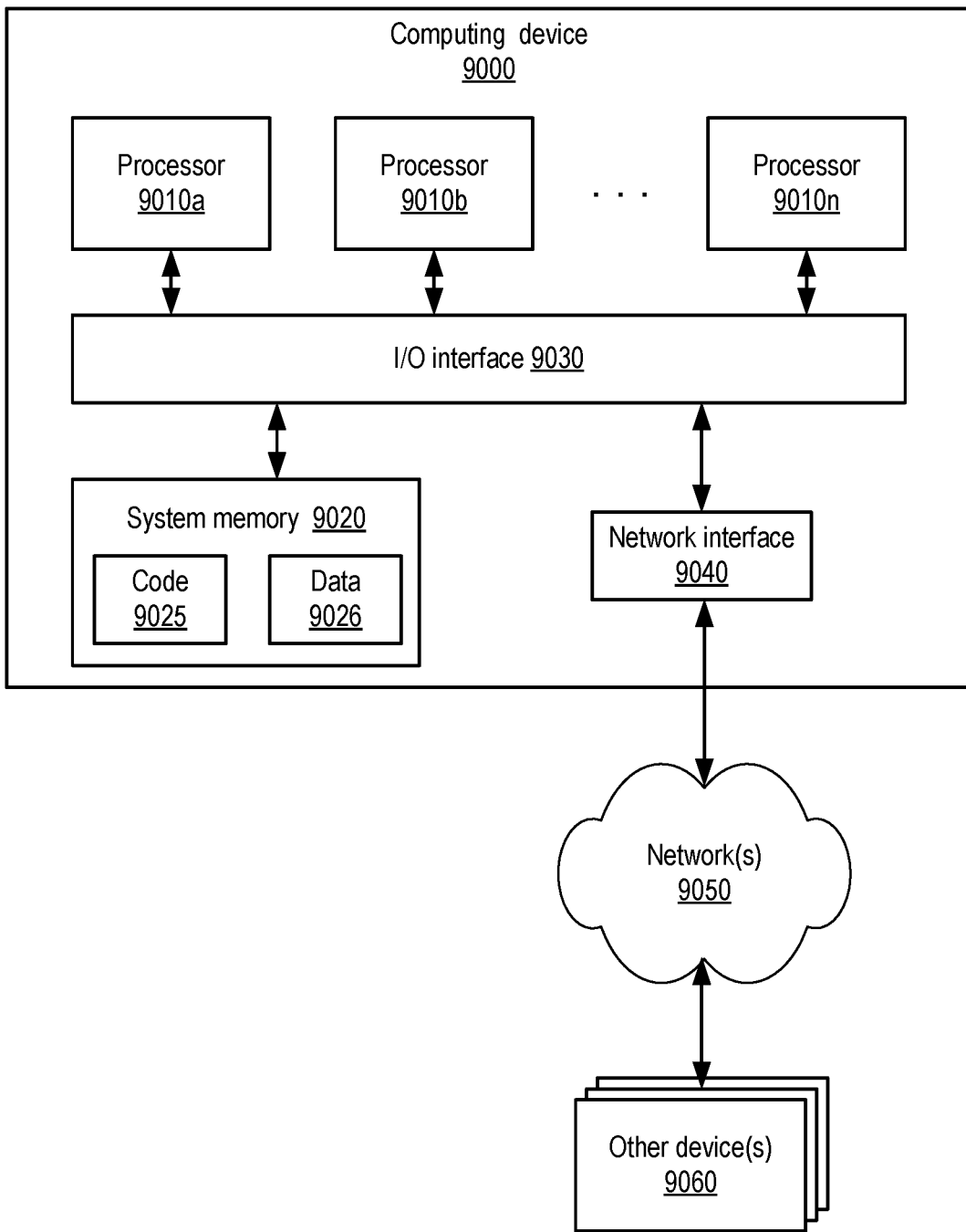
FIG. 12 is a block diagram illustrating an example computing device that may be used in at least some embodiments.

In at least some embodiments, a server that implements one or more of the techniques described above for supporting customizable placement policies (including for example the operations performed by placement managers, virtualization hosts, and other control-plane or data-plane components of a virtualized computing service) may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more control-plane components of a virtualized computing service, wherein the one or more control-plane components are executed at one or more computing devices of a provider network;
   wherein the one or more control-plane components are configured to:
      receive, via a programmatic interface, a plurality of indications of a plurality of placement policies for guest virtual machines, including a first placement policy, wherein the first placement policy includes (a) one or more policy applicability criteria and (b) one or more virtualization host selection rules;
      in response to verifying that the first placement policy meets an acceptance criterion of the virtualized computing service, store a representation of the first placement policy in a repository, wherein the repository comprises the plurality of placement policies; and
      in response to receiving a launch request for a particular guest virtual machine,
         select, based at least in part on one or more attributes of the launch request, a group of one or more placement policies, from the plurality of placement policies in the repository, applicable to the launch request, wherein the group of one or more placement policies includes the first placement policy, and wherein indications of the placement policies of the group of one or more placement policies were received prior to and separately from the launch request;
         determine, using the group of one or more placement policies, a candidate pool comprising one or more virtualization hosts of the virtualized computing service for the particular guest virtual machine;

determine a ranking, using the group of one or more placement policies, of the one or more virtualization hosts of the candidate pool; and instantiate the particular guest virtual machine at a target virtualization host selected from the candidate pool based at least in part on the ranking of the one or more virtualization hosts of the candidate pool.

2. The system as recited in claim 1, wherein the one or more control-plane components are configured to:

obtain respective sets of health metrics associated with the one or more virtualization hosts of the virtualized computing service;

generate a second placement policy based at least in part on (a) the respective sets of health metrics and (b) one or more service quality objectives of the virtualized computing service.

3. The system as recited in claim 1, wherein the one or more control-plane components are configured to:

obtain one or more user experience records associated with respective clients of the virtualized computing service;

generate a second placement policy based at least in part on an analysis of the one or more user experience records.

4. The system as recited in claim 1, wherein the one or more control-plane components are configured to:

receive a second launch request for a second guest virtual machine, wherein the second launch request includes an indication of a second placement policy which has not been transmitted earlier to the virtualized computing service; and select a virtualization host for the second guest virtual machine based at least in part on the second placement policy.

5. The system as recited in claim 1, wherein the first placement policy has a first precedence priority, wherein the group one or more placement policies includes a second placement policy with a second precedence priority, wherein the second placement policy is a system-generated policy, wherein the first placement policy is generated in response to a policy creation request from a client of the virtual computing service, wherein the second precedence priority is higher than the first precedence priority, and wherein the one or more control-plane components are configured to:

utilize the respective precedence priorities of the first and second placement policies to (a) determine the candidate pool and (b) rank the virtualization hosts of the candidate pool.

6. A method, comprising:
performing, by one or more control-plane components of a virtualized computing service:

receiving, via a programmatic interface, a plurality of indications of a plurality of placement policies for guest virtual machines, including a first placement policy, to be instantiated at the virtualized computing service, wherein the first placement policy includes one or more virtualization host selection rules;

selecting, based at least in part on one or more attributes of a launch request for a particular guest virtual machine, a group of one or more placement policies, from the plurality of placement policies in a repository of placement policies, that are applicable to the launch request, wherein the group of one or more placement policies includes the first placement policy, and wherein indications of the placement policies of the group of one or more placement policies were received prior to and separately from the launch request;

determining, using the group of one or more placement policies, a candidate pool of one or more virtualization hosts of the virtualized computing service for the particular guest virtual machine;

determining a ranking, using the group of one or more placement policies, of the one or more virtualization hosts of the candidate pool; and instantiating the particular guest virtual machine at a target virtualization host selected from the candidate pool based at least in part on the ranking of the one or more virtualization hosts of the candidate pool.

7. The method as recited in claim 6, further comprising performing, by the one or more control-plane components:

storing a representation of the first placement policy in a persistent repository of the virtualized computing service;

loading, into a cache from the repository prior to receiving an indication of the launch request, a representation of the one or more placement policies of the group applicable to the launch request;

wherein said identifying the one or more placement policies comprises examining the cache.

8. The method as recited in claim 6, wherein the group of one or more applicable policies includes a second placement policy, further comprising performing, by the one or more control-plane components:

storing an indication of a precedence priority of the first placement policy relative to the second placement policy, wherein the precedence priority is determined based at least in part on a source of the first placement policy, and wherein the precedence priority is utilized for one or more of: (a) determining the candidate pool or (b) ranking virtualization hosts of the candidate pool.

9. The method as recited in claim 6, wherein the source of the first placement policy is a client of the virtualized computing service, and wherein the source of the second placement policy is an entity other than a client, and wherein the precedence priority of the second placement policy is higher than the precedence priority of the first placement policy.

10. The method as recited in claim 6, wherein the virtualized computing service supports instantiation of guest virtual machines of a plurality of categories including a first category and a second category, wherein a performance capacity of a guest virtual machine of the first category differs from a performance capacity of the a guest virtual machine of the second category, wherein the indication of the first placement policy includes an applicability criterion of the first placement policy, wherein the applicability criterion indicates that the first placement policy is applicable to one or more of: (a) a particular category of the plurality of categories of guest virtual machines, (b) a particular collection of virtualization hosts whose resource utilization status meets a specified criterion, (c) a particular availability container of a provider network, (d) a particular data center, (e) a collection of guest virtual machines allocated to a particular client, wherein members of the collection meet a specified criterion.

11. The method as recited in claim 10, wherein the specified criterion met by members of the collection of guest virtual machines allocated to the particular client comprises one or more of: (a) membership in a placement group created for the particular client, wherein a property of a physical location of one guest virtual machine of the placement group relative to another guest virtual machine of the placement group is specified by the client, (b) membership in an application group created for the particular client, wherein individual ones of the guest virtual machines of the application group are used for respective components of a particular application, or (c) an association of a client-generated tag with individual ones of the collection of guest virtual machines.

12. The method as recited in claim 6, wherein the one or more virtualization host selection rules include a particular rule to rank members of the candidate pool of virtualization hosts based on one or more of: (a) a metric indicative of a physical distribution of a set of guest virtual machines instantiated on behalf of a particular client, (b) a performance metric, (c) a licensing efficiency metric, (d) a metric indicative of proximity with respect to one or more resources of a network-accessible service other than the virtual computing service, or (e) an infrastructure cost metric.

13. The method as recited in claim 12, wherein the service other than the virtual computing service comprises one or more of: (a) a storage service, (b) a database service, or (c) a load balancing service.

14. The method as recited in claim 6, wherein the one or more virtualization host selection rules include a particular rule to exclude, from the candidate pool of virtualization hosts, one or more of (a) a virtualization host whose virtualization management software stack meets a specified criterion, (b) a virtualization host which includes a hardware component meeting a specified criterion, (c) a virtualization host installed at a specified data center, or (d) a virtualization host at which a guest virtual machine meeting a specified criterion is instantiated.

15. The method as recited in claim 6, further comprising performing, by the one or more control-plane components:
    receiving, via the one or more programmatic interfaces, a request to modify a precedence priority of the first placement policy relative to a different placement policy; and
    storing an indication of a modified precedence policy of the first placement policy.

16. A non-transitory computer-accessible storage medium storing program instructions that when executed on one or more processors:
    receive a plurality of indications of a plurality of placement policies, including a first placement policy, for application execution environments to be instantiated using a fleet of hosts, wherein the first placement policy includes one or more host selection rules;
    in response to receiving a request for a particular application execution environment,
        identify a group of one or more placement policies from the plurality of placement policies applicable to the particular application execution environment, wherein the group includes the first placement policy, and wherein indications of the placement policies of the group of one or more placement policies were received prior to and separately from the request;
        determine, using the group of one or more placement policies, a candidate pool of one or more hosts of the fleet for the particular application execution environment;
        determine a ranking, using the group of one or more placement policies, of the one or more hosts of the candidate pool; and
        instantiate the particular application execution environment at a target host selected from the candidate pool based at least in part on the ranking of the one or more hosts of the candidate pool.

17. The non-transitory computer-accessible storage medium as recited in claim 16, wherein the instructions when executed at the one or more processors:
    receive, via the programmatic interface, a request to edit the first placement policy;
    generate an edited version of the first placement policy in accordance with the request to edit; and
    perform one or more validation operations on the edited version, and
    store the edited version of the first placement policy in a persistent repository after the one or more validation operations have succeeded.

18. The non-transitory computer-accessible storage medium as recited in claim 17, wherein the request to edit the first placement policy comprises an indication of a validity period of the first placement policy.

19. The non-transitory computer-accessible storage medium as recited in claim 16, wherein the instructions when executed at the one or more processors:
    determine that a second application execution environment, instantiated on a first host of the fleet, meets a migration criterion; and
    select, based at least in part on the first placement policy, a second host to which the second application execution platform environment is to be migrated.

20. The non-transitory computer-accessible storage medium as recited in claim 16, wherein the fleet of hosts comprises at least one host located in a data center of a provider network, and at least one host located at premises owned by a client of the provider network.

* * * * *